US005491015A

United States Patent [19]
Reeves et al.

[11] Patent Number: 5,491,015
[45] Date of Patent: * Feb. 13, 1996

[54] SLIP CONTROL SHEETING AND ARTICLES COVERED WITH SAME

[75] Inventors: Mark E. Reeves, Maplewood; Margaret A. Hartfel, Minneapolis, both of Minn.; Forrest J. Rouser, San Rafael, Calif.; Kenneth L. Smith, White Bear Lake; Olester Benson, Jr., Woodbury, both of Minn.

[73] Assignee: Minnesota Mining and Manufacturing Company, St. Paul, Minn.

[ * ] Notice: The portion of the term of this patent subsequent to Aug. 10, 2010, has been disclaimed.

[21] Appl. No.: 929,685

[22] Filed: Aug. 13, 1992

Related U.S. Application Data

[63] Continuation-in-part of Ser. No. 751,147, Aug. 28, 1991, Pat. No. 5,234,740.

[51] Int. Cl.[6] .............................. B32B 3/28; A63B 49/08; B25G 1/01; B62K 21/26

[52] U.S. Cl. .................... 428/167; 428/76; 428/120; 428/141; 428/172; 428/212; 428/245; 428/284; 428/286; 428/346; 428/354; 428/542.8; 74/551.9; 81/489; 16/DIG. 12; 273/75; 273/81 B; 273/81 R

[58] Field of Search .................................. 428/156, 167, 428/172, 178, 174, 179, 76, 95, 96, 120, 141, 212, 224, 245, 284, 286, 343, 346, 354, 542.8; 273/75, 81 B, 81 R; 16/DIG. 12; 81/489; 74/543, 551.9

[56] References Cited

U.S. PATENT DOCUMENTS

| | | | |
|---|---|---|---|
| 3,585,101 | 6/1971 | Stratton et al. | 161/116 |
| 3,684,348 | 8/1972 | Rowland | 350/103 |

(List continued on next page.)

FOREIGN PATENT DOCUMENTS

| | | |
|---|---|---|
| 733014 | 4/1966 | Canada . |
| 033301 | 8/1981 | European Pat. Off. . |
| 2125305 | 9/1972 | France . |
| 2669543 | 5/1992 | France . |
| 263450A1 | 1/1989 | German Dem. Rep. . |
| 2807658A1 | 9/1979 | Germany . |
| 3203023A1 | 8/1983 | Germany . |
| 3703225A1 | 8/1988 | Germany . |
| 1458918 | 12/1976 | United Kingdom . |

(List continued on next page.)

OTHER PUBLICATIONS

M. M. Koura, "The Effect of Surface Texture on Friction Mechanisms", *Wear*, vol. 63, No. 1, pp. 1–12 (1980).
U.S. Application Serial No. 07/875,186, filed Apr. 28, 1992 (Rouser et al.).
Performance Bicycle catalog, p. 29, Autumn 1992, published by Performance Bicycle Shop of Chapel Hill, North Carolina.

*Primary Examiner*—Donald J. Loney
*Attorney, Agent, or Firm*—Carolyn V. Peters; Gary L. Griswold; Walter N. Kirn

[57] ABSTRACT

A slip control sheeting can comprise a backing having a first and a second major surface and an array of protrusions on the first major surface. The protrusions can be pyramids with polygonal bases or pyramidal frustums with polygonal bases. Alternatively, the protrusions can comprise posts having non-planar sides and bases on the first major surface wherein the posts taper radially inwardly from their bases to their tops, e.g., cones or conical frustums with circular bases. The sheeting can further comprise at least one of a layer of adhesive on the second major surface, a reinforcing web, or a mechanical fastening component for fastening the backing to a substrate. The sheeting can be made so that it retroreflects less than about 10 percent of a beam of electromagnetic radiation which is incident at any angle to the second major surface, the electromagnetic radiation having any wavelength from about 0.39 microns to about 1,000 microns.

28 Claims, 4 Drawing Sheets

U.S. PATENT DOCUMENTS

| | | | |
|---|---|---|---|
| 3,689,346 | 9/1972 | Rowland | 156/245 |
| 4,226,418 | 10/1980 | Balfour | 273/75 |
| 4,259,286 | 3/1981 | Louis et al. | 264/555 |
| 4,343,848 | 8/1982 | Leonard, Jr. | 428/156 |
| 4,364,723 | 12/1982 | Louis et al. | 425/384 |
| 4,478,769 | 10/1984 | Pricone et al. | 264/1.6 |
| 4,488,918 | 12/1984 | Jofs | 156/79 |
| 4,576,850 | 3/1986 | Martens | 428/156 |
| 4,691,387 | 9/1987 | Lopez | 2/161 A |
| 4,875,259 | 10/1989 | Appeldorn | 24/576 |
| 4,881,275 | 11/1989 | Cazares et al. | 2/161 A |
| 4,959,265 | 9/1970 | Wood | 428/343 |
| 5,055,340 | 10/1991 | Matsumura et al. | 428/172 |
| 5,234,740 | 8/1993 | Reeves et al. | 428/167 |

FOREIGN PATENT DOCUMENTS

| | | |
|---|---|---|
| 2062479 | 5/1981 | United Kingdom . |
| 2057894 | 5/1983 | United Kingdom . |
| 2265441 | 3/1992 | United Kingdom . |
| WO85/04592 | 10/1985 | WIPO . |

SLIP CONTROL SHEETING AND ARTICLES COVERED WITH SAME

CROSS-REFERENCE TO RELATED APPLICATIONS

This application is a continuation-in-part of application Ser. No. 751,147 filed Aug. 28, 1991, now U.S. Pat. No. 5,234,740.

FIELD OF INVENTION

The present invention relates to slip control sheetings with a structured surface and articles, e.g., gymnastic apparatuses and handles of tools, mallets, racquets, baseball bats, golf clubs, and sport sticks, with such sheeting applied thereto.

BACKGROUND

Gymnastic apparatuses such as pommel horses are typically covered with leather covers. Because such covers are usually somewhat slippery when new, they are typically conditioned by roughening with scouring pads, wire brushes, knives, etc. Scouring is typically done by hand with a circular motion resulting in a visible pattern of swirls on the surface. Conditioning in this fashion entails cutting and gouging the surface of the cover, tending to result in shortened life of the cover, making it necessary to have the apparatus recovered periodically.

Gymnasts frequently apply chalk to their hands when practicing and during performances. This chalk builds up on the cover of the apparatus, filling in the texture and leaving a smooth, somewhat hard surface that must be brushed or sanded to remove the chalk. Because of the pattern of swirls and rough texture of a hand-conditioned cover, it is difficult to remove chalk as desired. In addition to chalk, such substances as KARO Brand Corn Syrup, pine tar, and spray adhesive are sometimes used by gymnasts to improve their grip to conventional covers.

In light of these conditions, conventional gymnastic apparatus covers, which cost several hundred dollars, may wear out after relatively short periods, presenting substantial costs to schools and other gymnasium operators. Also, surface conditioning practices and uneven wear may impart substantially non-uniform characteristics to a cover, presenting potentially unsafe conditions to a gymnast as seemingly similar portions of a cover may exhibit substantially different properties. In some cases, falls may lead to serious injuries such as broken bones and paralysis. The need for higher grip surfaces for gymnastics apparatuses has been known for a long time.

Because the handles of many tools, mallets, racquets, golf clubs and sport sticks have leather grips, some of the same problems associated with the use of leather covers for gymnastic apparatuses are also encountered during use of these handles. For example, the leather grips can be slippery when new. Perhaps more importantly, the leather grips tend to become impregnated with perspiration during use of the grips, causing the grips to become more slippery with increasing use. Of course, this can result in reduced gripping of the handle and a consequent drop in safety and performance potential. For this reason, users of leather gripped handles often apply chalk or tacky substances to the grips to improve their gripping. The repeated cycles of impregnation of the leather grip with perspiration and subsequent drying in the periods when the grip is not being used, combined with natural aging, result in rapid drying of the leather grip, which loses its softness and must be replaced. Further, if chalk or tacky substances are applied to the leather grip, there may be a tendency for these materials to build up on the grip and further reduce the life of the grip.

In light of the above drawbacks associated with the use of leather grips, some people have substituted rubber or plastic grips for the leather grips. These substitute grips have some advantages over leather grips since they tend to resist perspiration impregnation, can be easier to dry, may not age as quickly, and may be washable. However, the need for better gripping characteristics has remained.

U.S. Pat. No. 3,585,101 (Stratton et al.) discloses a material comprising a film having a knurled pattern, e.g., a series of ridges, on one surface and an adhesive layer on the opposite surface. U.S. Pat. No. 4,488,918 (Jofs) discloses a plastic film having a non-slip surface comprising spaced random patterns of rigid peaks and ridges formed of a second thermoplastic layer coextruded with and bonded to the plastic film. European Patent Application No. 81830005.5, Publication No. 033,301 (Gibello) discloses handle coverings for tennis racquets and the like which comprise sleeves with relief patterns for a good grip. U.K. Patent No. 2,057,894 (Sasaki) discloses a tape for grips of game and sports appliances, e.g., racquets.

SUMMARY OF INVENTION

The present invention provides a novel and unobvious slip control sheeting having a structured surface as defined below and articles with such sheeting applied thereto. In particular, the present invention provides novel and unobvious gymnastic structures having such sheetings secured to the covers thereof.

In brief summary, the slip control sheeting of the invention comprises a backing having a first major surface and a second major surface. The first major surface bears an array of protrusions, e.g., pyramids or pyramidal frustums, that are specially configured to provide desired slip control properties. Adapted to be secured to the surface of a gymnastic apparatus, e.g., pommel horse, the sheeting typically comprises at least one of (1) an adhesive layer on the second surface of the backing, (2) a reinforcing web, or (3) a mechanical fastening component for fastening the backing to a substrate.

The invention also relates to a sheeting comprising an array of protrusions in the form of pyramids or pyramidal frustums on the first major surface of a backing, wherein the sheeting retroreflects less than about 10 percent of a beam of electromagnetic radiation which is incident at any angle to a second major surface of the backing, the electromagnetic radiation having any wavelength from about 0.39 microns to about 1,000 microns.

In another of its embodiments, the invention relates to a sheeting comprising an array of protrusions in the form of posts having bases on the first major surface of a backing, wherein the posts have non-planar sides and taper radially inwardly from their bases to their tops. The posts preferably comprise cones or conical frustums which have substantially circular bases.

The invention also provides articles which are adapted for interaction with hands or feet, such as gymnastic stations, athletic equipment, tools and mallets, to which slip control sheetings of the invention have been applied.

Among the many advantages that can be provided by this invention are that articles to which sheetings of the invention have been applied exhibit more uniform and more consistent slip control properties, thereby enhancing their safe, convenient, and effective use. Also, articles such as gymnastic equipment covered with sheetings of the invention exhibit improved durability, retention of more uniform slip properties over entire service life time, and more consistent slip properties over the entire apparatus. Sheetings of the invention may be applied to new or older gymnastic equipment.

BRIEF DESCRIPTION OF DRAWING

The invention will be further explained with reference to the drawing, wherein:

FIGS. 1–3 are idealized and are not to scale. FIGS. 1–7 are all intended to be merely illustrative and non-limiting.

DETAILED DESCRIPTION OF ILLUSTRATIVE EMBODIMENTS

Figure 1:
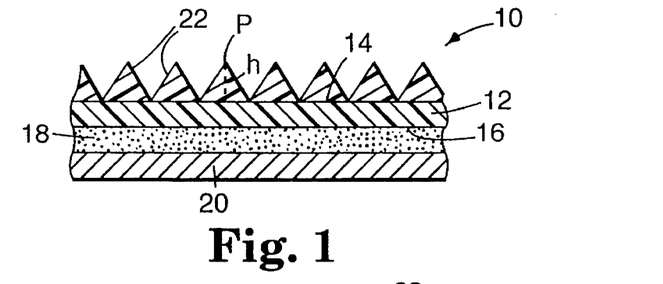
FIG. 1 is a cross-section of a portion of an illustrative slip control sheeting of the invention.

FIG. 1 illustrates an illustrative slip control sheeting of the invention 10 comprising backing 12 having first major surface 14 and second major surface 16 and optional adhesive layer 18 on second major surface 16. First major surface 14 and second major surface 16 are typically generally planar. Adhesive layer 18 will typically be covered by optional release liner 20 during shipping and storage of sheeting 10. First major surface 14 bears an array (i.e., an orderly arrangement such as a regularly repeating pattern) of protrusions 22 thereon. Protrusions 22 may be discrete elements laminated to backing 12 or may be integral parts of backing 12, i.e., backing 12 may be structured in the form of protrusions 22.

In a first embodiment of the invention, protrusions 22 comprise pyramidal protrusions, i.e., pyramids with polygonal bases or pyramidal frustums with polygonal bases. Each polygonal base is disposed on first major surface 14 of backing 12 and is defined by a plurality of line segments which lie in or on the plane of first major surface 14.

Figure 2:
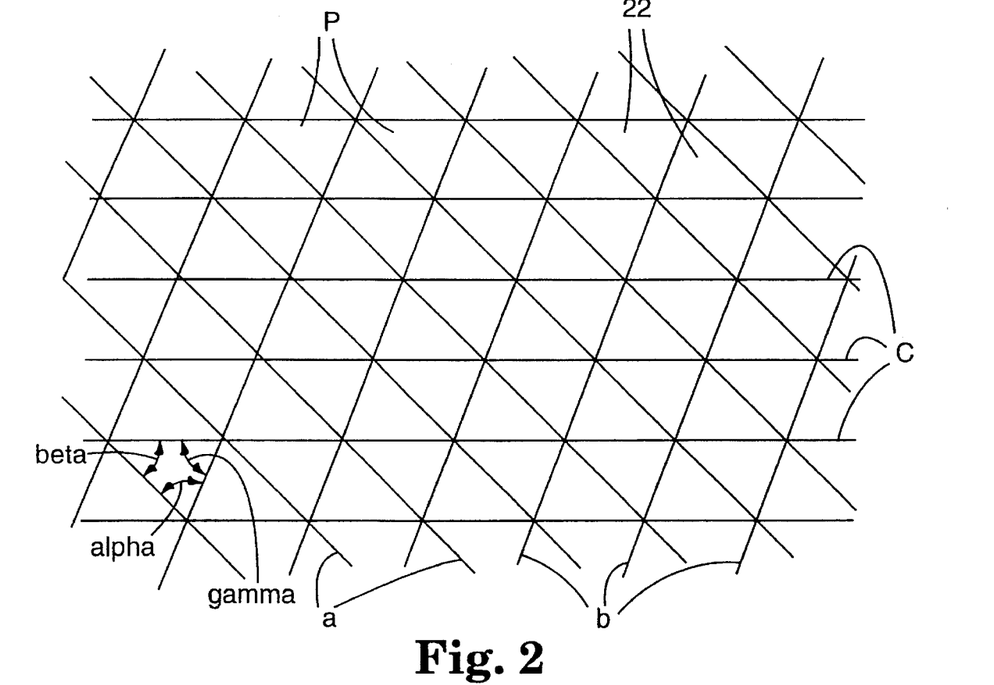
FIG. 2 is a plan view of a portion of the first major surface of an illustrative slip control sheeting of the invention.

The polygonal bases of protrusions 22 are preferably selected from the group consisting of triangular bases, quadrilateral bases, pentagonal bases, hexagonal bases, heptagonal bases, octagonal bases, nonagonal bases and decagonal bases. In a most preferred form of the first embodiment, as shown in FIGS. 1 and 2, protrusions 22 are triangular pyramids, i.e., three-sided pyramids having triangular bases. As shown in FIG. 2, the polygonal bases of protrusions 22 are typically immediately adjacent one another such that there is no land separating the polygonal bases.

The line segments defining the sides of the polygonal base of each pyramidal protrusion are preferably relatively equal in length, but need not be. By relatively equal, it is meant that the length of the shortest line segment is equal to at least about 50 percent of the length of the longest line segment. Most preferably, the line segments defining the sides of the polygonal base of each pyramidal protrusion are equal in length. Each line segment is typically between about 5 and about 75 mils (125 and 1,875 microns), but preferably is between about 5 and about 30 mils (125 and 750 microns), and most preferably between about 10 and about 20 mils (250 and 500 microns), in length.

In the illustrative embodiment shown in FIG. 2, a pattern of three intersecting sets of parallel v-shaped grooves yields the structured surface. The apexes of each set of grooves are identified as a, b, and c. The base of each individual protrusion 22 is defined by one groove of each of the three sets. As mentioned above, the three sides of the base of each three-sided pyramid are typically relatively equal in length. This can be controlled by selection of the intersection angles between the three sets of grooves, i.e., angles alpha, beta, and gamma. Each side of the base of a pyramidal protrusion and the peak of that protrusion defines a plane, referred to herein as a face of the protrusion. The faces of each protrusion are preferably relatively equal in area.

The direction parallel to each set of grooves is referred to herein as a major axis of the sheeting. Thus, the sheeting shown in FIG. 2 has three major axes. We have found that the maximum grip or friction provided by sheeting of the invention is obtained in a direction perpendicular to one of the major axes of the sheeting. In some instances, sheetings of the invention are characterized as having directional gripping characteristics.

In a second embodiment of the invention, protrusions 22 comprise posts having non-planar sides and bases on first major surface 14. The posts taper radially inwardly from their bases to their tops. Preferably, the posts comprise substantially circular bases and the posts are either cones or conical frustums. Most preferably, land areas separate adjacent ones of the bases of the posts.

With respect to sheetings of the invention in general, if the protrusions comprise pyramidal or conical frustums, each frustum typically has a planar top or upper surface which is parallel to its base, although it is contemplated that the planar top or upper surface of the frustum can be inclined at an angle relative to the frustum's base. Further, the tops or upper surfaces of the frustums are not necessarily planar.

If a sheeting of the invention comprises pyramids or cones, it is typically preferred, but not essential, that the peak of the pyramid or cone be centered over the geometric center of the base of the pyramid or cone. If a sheeting of the invention comprises pyramidal or conical frustums, it is preferred, but not essential, that the planar tops of the frustums have geometric centers which are centered over the geometric centers of their respective bases. In some instances, if the protrusions of a sheeting have peaks or planar tops which are "horizontally offset" from their respective bases, the sheeting may have directional gripping characteristics as a result. Sheetings having directional gripping characteristics would likely be considered desirable in many envisioned applications.

With respect to either embodiment of the invention, the protrusions are typically between about 3 mils and about 21 mils (75 and 525 microns), preferably between about 5 mils and 9 mils (125 and 225 microns), and most preferably about 7 mils (175 microns), in height. In some embodiments, sheetings of the invention can comprise protrusions up to about 30 mils (750 microns) in height, although such sheetings may tend to be abrasive to one's skin. As used herein and shown in FIG. 1, the height h of a protrusion refers to the length of the shortest possible line segment extending from the protrusion's peak P to its base. The protrusion's peak is defined to be the highest point of the protrusion, i.e., the point of the protrusion located furthest from the plane in which first major surface 14 lies.

The shape of a protrusion is characterized by its aspect ratio, which is defined as the ratio of the protrusion's height h to its equivalent base diameter $D_{eq}$. Where the base of the protrusion is a circle, the equivalent base diameter $D_{eq}$ is simply the diameter of the circle. Where the base of the protrusion is not a circle, the equivalent base diameter $D_{eq}$ is defined as the diameter of a hypothetical circle having the same area as the base. It is believed that the invention can be practiced satisfactorily if the protrusions have an aspect ratio which is from about 0.1 to about 5. Most preferably, the aspect ratio for pyramidal protrusions is from about 0.3 to about 0.6, and the aspect ratio for protrusions which are tapered posts is about 2.

Backing 12 typically comprises a polymeric film selected from, for example, the group consisting of polyvinyls, polyurethanes, polyesters, e.g., polyethylene terephthalate, polyacrylics, polycarbonates, polyolefins, and mixtures thereof. Polyurethanes are presently preferred because they typically yield slip control sheetings which offer an optimum combination of high toughness and durability coupled with high softness and flexibility. Polyacrylics typically yield slip control sheetings that are relatively rigid. Further, the backing can be a solid film or a foamed film.

Backing 12, excluding the height of the protrusions, is typically between about 2 mils and about 100 mils (50 and 2,500 microns) thick, and most preferably between about 4 mils and about 20 mils (100 and 500 microns) thick. Referring again to FIG. 1, the sheeting of the invention can include optional release liner 20 and optional adhesive layer 18, adhesive layer 18 typically comprising an adhesive selected to provide a strong bond to the substrate article to which the resultant sheeting is to be applied. For example, heat-activated adhesives, pressure-sensitive adhesives, and mixtures thereof can be used. An illustrative example of a useful adhesive is Adhesive Transfer Tape 950 from Minnesota Mining and Manufacturing Company. Many suitable epoxy, urethane, and acrylic adhesives are commercially available.

However, sheetings of the invention need not include adhesive layer 18 or release liner 20. For instance, the sheeting of the invention can alternatively comprise a reinforcing web, e.g., a sheet of fabric, or a mechanical fastening component for fastening the backing to a substrate. Further, sheetings of the invention can include combinations of two or more of the above. Sheetings having a reinforcing web are considered especially useful when it is desired to sew the sheeting to a substrate.

If the sheeting comprises a reinforcing web, backing 12 will in some instances be sufficiently thick to embed the web therein. Alternatively, the web can merely be suitably secured to second major surface 16 of backing 12. Embedded webs can impart increased tear resistance and tensile strength, enabling the slip control sheeting to be attached to a substrate via sewing more effectively. Also, in cases where the web protrudes from second major surface 16 of backing 12, the web can provide an increased surface area, thereby improving the bond to an adhesive layer or substrate.

If the sheeting of the invention comprises a mechanical fastening component for fastening the backing to a substrate, the mechanical fastening component can take the form of a plurality of hooks or a plurality of loops disposed on second major surface 16, the hooks or loops constituting part of a hook and loop type fastening system, e.g., a VELCRO Brand fastener.

Most preferably, the mechanical fastening component would take the form of a structured surface which includes a plurality of tapered elements. Each tapered element can comprise a side which is inclined relative to the plane of the structured surface at an angle sufficient to form a taper. With such a construction, each tapered element is adapted to mate through a frictional or torsional force of adherence with at least one corresponding element of a complementarily structured surface of a substrate. An example of a mechanical fastening component which utilizes a frictional force of adherence is disclosed in U.S. Pat. No. 4,875,259 (Appeldorn), which is incorporated in its entirety herein by reference. A torsional force of adherence can be effected if at least one of the tapered elements of the structured surface of the sheeting or the complementarily structured surface of the substrate can be axially bent or torsionally flexed relative to its relaxed, unfastened position. This permits the sheeting to be fastened with a substrate in a random alignment. An example of this type of mechanical fastening component is disclosed in U.S. application Ser. No. 07/875,186, filed Apr. 28, 1992, presently pending, which is incorporated in its entirety herein by reference.

In some instances, the protrusions of the sheeting may be made of a first, relatively hard and highly durable material, and the backing may be made of a relatively more flexible material. Further, the material of the protrusions can comprise an abrasive or other fillers. Although the protrusions preferably comprise a substantially solid material, it is contemplated that the protrusions can be made of foam. Further, all or a portion of each protrusion can be filled with a fluid, e.g., a gas such as air or nitrogen. If a gas were used, the pressure of the gas within each protrusion would have to be selected to provide the protrusions with the desired amount of compressibility.

Properly constructed sheetings of the invention generally exhibit a combination of high durability and friction due to the coupling of hard protrusions (e.g., polycarbonate), which are typically substantially incompressible and non-collapsible, with a more conformable, flexible backing material (e.g., polyurethane) that results in a more cushioned impact during use. Typically, a sheeting of the invention is sufficiently flexible to be wound about itself on a 1 inch (2.54 cm) diameter mandrel.

Some embodiments of sheetings of the invention can be made using techniques which are somewhat similar to those used to make cube-corner retroreflective sheetings. It will be understood, however, that a sheeting of the invention can be made of a substantially non-retroreflective material such as a substantially opaque or translucent material if desired, and can even be made in a variety of colors if desired. For example, referring to FIG. 1, sheeting 10 can be made such that it will retroreflect less than about 10 percent of a beam of electromagnetic radiation which is incident at any angle to second major surface 16, the electromagnetic radiation having any wavelength within the visible light or infrared radiation regions, i.e., wavelengths ranging from about 0.39 microns to about 1,000 microns. Thus, at least a portion of sheeting 10 can have a structure similar to retroreflective sheetings, but need not be retroreflective. This means that sheeting 10 can be made of less expensive materials because optical performance is not a concern. Further, sheeting 10 need not necessarily be manufactured in as precise a manner as retroreflective sheetings of the prior art since optical performance is not needed.

A sheeting of the invention may be formed by cutting a series of v-shaped grooves into a solid sheeting, molding a sheeting with the desired protrusions thereon, or molding protrusions and then applying them to a desired backing sheet. Many of the techniques used for fabricating cube-corner retroreflective sheeting may be used to form slip control sheets of the invention, with the important advantage that the optical properties critical to retroreflective sheetings are not necessary for sheets of the invention. U.S. Pat. No. 4,576,850 (Martens), which is incorporated in its entirety herein by reference, discloses a process for replicating microstructured surfaces that may be used in making sheetings of the invention. U.S. Pat. No. 3,689,346 (Rowland) also discloses a method comprising applying a hardenable molding material over a mold having a multiplicity of cube-corner formations therein.

Figure 3:
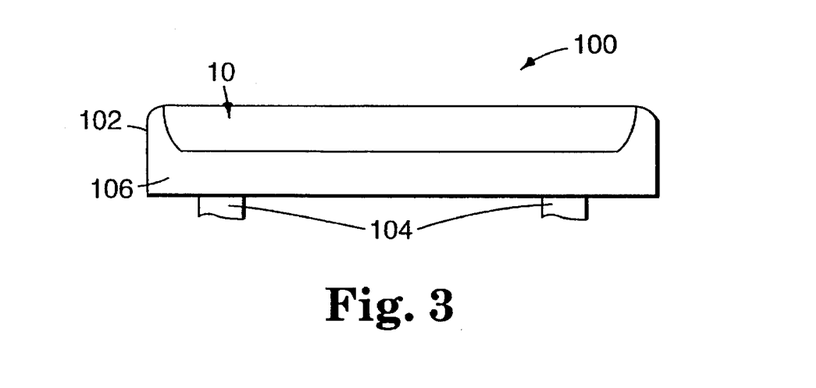
FIG. 3 is a side view of a gymnastic station to which a sheeting of the invention has been applied.

Illustrative examples of gymnastic apparatuses or stations to which sheetings of the invention may be applied include vaulting horses, pommel horses, parallel bars, uneven bars, high bars, balance beams, vault spring boards, vault runways, still rings and landing mats. FIG. 3 illustrates vaulting horse 100 with body 102 on legs 104. A slip control sheeting 10 has been applied to surface 106.

Desired flexibility, elasticity, and conformability of the sheeting is dependent in part upon the station to which it is to be applied. For instance, in the case of the balance beam, vaulting horse, pommel horse, vault spring board and landing mats, the sheeting should be somewhat elastic and conformable so as to give or compress under pressure of the gymnasts' hands and/or feet. During use, the parallel bars, uneven bars, and high bar do not compress in this fashion but they typically flex. Accordingly, a sheeting of the invention for use thereon should be flexible.

Sheetings of the invention may be applied to the handles of such athletic equipment as baseball bats, golf clubs, and tennis, racquetball, squash, and badminton racquets. If desired, sheetings of the invention may be applied to the gripping surfaces of gloves to improve the grip obtained with conformable surfaces, e.g., rubber or foam-covered bats or water ski handles. Sheetings of the invention may be applied to the handles of mallets or tools such as hammers, pliers, wire cutters, screw drivers, wrenches, etc.

Sheetings of the invention may be used with bars provided in rest rooms for handicapped persons or railings in stairwells as they are a convenient means for providing secure, effective slip control and readily cleaned or washed surfaces. They may also be applied to such articles as diving boards and the areas around swimming pools. Further, sheetings of the invention can be applied to the support surfaces of eye glasses, especially the support surfaces which come in contact with the wearer's nose.

In general, a slip control sheeting of the invention can be secured to a surface of an article which is adapted for interaction with hands or feet to impart favorable slip control properties to the surface. It is contemplated that such articles would include articles adapted to be manipulated by one's hand, such as hammers, as well as articles which provide secure footing, such as shower mats.

EXAMPLES

The invention will be further explained by the following illustrative examples which are intended to be nonlimiting.

Two resident male gymnastic athletes at the Olympic Training Center in Colorado Springs, Colorado, regional finalists for the Senior National Team, were videotaped using a high speed video camera, NAC HSV-44, operating at 400 frames/second while performing two handspring full vaults each on two different vaulting horses. The vaulting horses were substantially identical except that Horse A was covered with a conventional plasticized polyvinyl chloride cover that was about 1 year old and Horse B was covered with a slip control sheeting comprising a 10 mil (250 micron) thick polyurethane backing with polyurethane protrusions thereon. The protrusions were three-sided pyramids about 7 mils (175 microns) in height formed from a master made by cutting v-shaped grooves, with angles alpha and beta equal to about 55° and angle gamma equal to about 70°. The grooves in set a were spaced about 14 mils (355 microns) apart, the grooves in set b were spaced about 16 mils (410 microns) apart, and those in set c were spaced about 16 mils (410 microns) apart.

Each gymnast wore a reflective target on the outside of his right hand near the proximal head of the fifth metacarpal. Digital analysis was performed using the Peak Performance Video and Analog Motion Measurement System from Peak Performance Technologies, Inc., Englewood, Colo., U.S.A. The video digitizing/playback system employed a Panasonic AG-7300 video cassette recorder, a Sony Trinitron monitor, and an IBM-compatible computer. Coordinate data was smoothed using a low-pass, fourth order, zero lag Butterworth digital filter with a cutoff frequency of 5 Hertz. Smoothed coordinate data were used to calculate displacement and velocity parameters.

Table I contains the displacement results from Horse A. This information is shown graphically in FIG. 4. Table II contains the displacement results from Horse B. This information is shown graphically in FIG. 5.

Table III contains the resultant velocities for vaults 1 and 2 on Horse A. Table IV contains the resultant velocities for vaults 3 and 4 on Horse A. This information is shown graphically in FIG. 6.

Table V contains the resultant velocities for vaults 1 and 2 on Horse B. Table VI contains the resultant velocities for vaults 3 and 4 on Horse B. This information is shown graphically in FIG. 7.

TABLE I

Displacement Data: Horse A
Units: meters

| time (sec) | Vault #1 | | Vault #2 | | Vault #3 | | Vault #4 | |
|---|---|---|---|---|---|---|---|---|
| | x displ. | y displ. | x displ. | y displ. | x displ. | y displ. | x displ. | y displ. |
| −0.1050 | −0.296 | 0.144 | −0.340 | 0.136 | −0.301 | 0.208 | −0.245 | 0.091 |

TABLE I-continued

Displacement Data: Horse A
Units: meters

|  | Vault #1 | | Vault #2 | | Vault #3 | | Vault #4 | |
| --- | --- | --- | --- | --- | --- | --- | --- | --- |
| time (sec) | x displ. | y displ. | x displ. | y displ. | x displ. | y displ. | x displ. | y displ. |
| −0.1025 | −0.285 | 0.139 | −0.330 | 0.133 | −0.293 | 0.204 | −0.235 | 0.087 |
| −0.1000 | −0.274 | 0.134 | −0.320 | 0.129 | −0.284 | 0.200 | −0.225 | 0.083 |
| −0.0975 | −0.263 | 0.129 | −0.310 | 0.126 | −0.276 | 0.196 | −0.215 | 0.080 |
| −0.0950 | −0.253 | 0.124 | −0.300 | 0.123 | −0.267 | 0.192 | −0.205 | 0.076 |
| −0.0925 | −0.242 | 0.119 | −0.290 | 0.119 | −0.258 | 0.187 | −0.195 | 0.072 |
| −0.0900 | −0.232 | 0.114 | −0.280 | 0.116 | −0.249 | 0.182 | −0.185 | 0.068 |
| −0.0875 | −0.222 | 0.109 | −0.270 | 0.112 | −0.240 | 0.178 | −0.176 | 0.065 |
| −0.0850 | −0.213 | 0.104 | −0.260 | 0.108 | −0.230 | 0.173 | −0.166 | 0.061 |
| −0.0825 | −0.204 | 0.099 | −0.250 | 0.104 | −0.221 | 0.168 | −0.156 | 0.057 |
| −0.0800 | −0.195 | 0.094 | −0.240 | 0.100 | −0.211 | 0.162 | −0.147 | 0.053 |
| −0.0775 | −0.186 | 0.089 | −0.230 | 0.096 | −0.202 | 0.157 | −0.138 | 0.049 |
| −0.0750 | −0.178 | 0.085 | −0.220 | 0.092 | −0.193 | 0.152 | −0.128 | 0.046 |
| −0.0725 | −0.170 | 0.080 | −0.210 | 0.087 | −0.183 | 0.146 | −0.120 | 0.042 |
| −0.0700 | −0.162 | 0.076 | −0.200 | 0.083 | −0.174 | 0.141 | −0.111 | 0.038 |
| −0.0675 | −0.155 | 0.072 | −0.190 | 0.078 | −0.165 | 0.135 | −0.102 | 0.035 |
| −0.0650 | −0.148 | 0.067 | −0.180 | 0.074 | −0.156 | 0.129 | −0.094 | 0.031 |
| −0.0625 | −0.141 | 0.063 | −0.170 | 0.069 | −0.147 | 0.123 | −0.086 | 0.028 |
| −0.0600 | −0.134 | 0.059 | −0.160 | 0.064 | −0.139 | 0.117 | −0.078 | 0.025 |
| −0.0575 | −0.128 | 0.055 | −0.160 | 0.060 | −0.130 | 0.111 | −0.071 | 0.022 |
| −0.0550 | −0.121 | 0.051 | −0.150 | 0.055 | −0.122 | 0.105 | −0.064 | 0.019 |
| −0.0525 | −0.115 | 0.047 | −0.140 | 0.050 | −0.114 | 0.099 | −0.058 | 0.017 |
| −0.0500 | −0.109 | 0.043 | −0.130 | 0.046 | −0.106 | 0.093 | −0.051 | 0.014 |
| −0.0475 | −0.103 | 0.040 | −0.130 | 0.042 | −0.099 | 0.087 | −0.045 | 0.012 |
| −0.0450 | −0.097 | 0.036 | −0.120 | 0.037 | −0.091 | 0.082 | −0.040 | 0.010 |
| −0.0425 | −0.091 | 0.033 | −0.110 | 0.033 | −0.084 | 0.076 | −0.035 | 0.009 |
| −0.0400 | −0.085 | 0.029 | −0.100 | 0.029 | −0.078 | 0.070 | −0.030 | 0.007 |
| −0.0375 | −0.079 | 0.026 | −0.100 | 0.026 | −0.071 | 0.064 | −0.025 | 0.006 |
| −0.0350 | −0.073 | 0.023 | −0.090 | 0.023 | −0.065 | 0.058 | −0.021 | 0.005 |
| −0.0325 | −0.067 | 0.020 | −0.080 | 0.020 | −0.058 | 0.053 | −0.018 | 0.004 |
| −0.0300 | −0.061 | 0.018 | −0.080 | 0.017 | −0.653 | 0.047 | −0.015 | 0.003 |
| −0.0275 | −0.055 | 0.015 | −0.070 | 0.014 | −0.047 | 0.042 | −0.012 | 0.003 |
| −0.0250 | −0.049 | 0.013 | −0.060 | 0.012 | −0.041 | 0.037 | −0.009 | 0.002 |
| −0.0225 | −0.044 | 0.011 | −0.060 | 0.010 | −0.036 | 0.032 | −0.007 | 0.002 |
| −0.0200 | −0.038 | 0.009 | −0.050 | 0.008 | −0.031 | 0.028 | −0.005 | 0.002 |
| −0.0175 | −0.033 | 0.008 | −0.040 | 0.007 | −0.027 | 0.023 | −0.004 | 0.001 |
| −0.0150 | −0.028 | 0.006 | −0.040 | 0.005 | −0.022 | 0.019 | −0.003 | 0.001 |
| −0.0125 | −0.023 | 0.005 | −0.030 | 0.004 | −0.018 | 0.015 | −0.002 | 0.001 |
| −0.0100 | −0.018 | 0.004 | −0.030 | 0.003 | −0.014 | 0.012 | −0.001 | 0.001 |
| −0.0075 | −0.013 | 0.003 | −0.020 | 0.002 | −0.010 | 0.008 | 0.000 | 0.001 |
| −0.0050 | −0.009 | 0.002 | −0.010 | 0.002 | −0.006 | 0.005 | 0.000 | 0.001 |
| −0.0025 | −0.004 | 0.001 | −0.010 | 0.001 | −0.003 | 0.002 | 0.000 | 0.000 |
| 0.0000 | 0.000 | 0.000 | 0.000 | 0.000 | 0.000 | 0.000 | 0.000 | 0.000 |
| 0.0025 | 0.004 | −0.001 | 0.010 | 0.000 | 0.004 | −0.003 | 0.000 | 0.000 |
| 0.0050 | 0.007 | −0.001 | 0.010 | −0.001 | 0.006 | −0.005 | 0.000 | 0.000 |
| 0.0075 | 0.011 | −0.002 | 0.020 | −0.002 | 0.009 | −0.007 | 0.000 | 0.000 |
| 0.0100 | 0.014 | −0.002 | 0.020 | −0.002 | 0.012 | −0.009 | −0.001 | 0.000 |
| 0.0125 | 0.017 | −0.003 | 0.030 | −0.003 | 0.015 | −0.011 | −0.001 | 0.000 |
| 0.0150 | 0.019 | −0.003 | 0.040 | −0.003 | 0.017 | −0.013 | −0.001 | 0.000 |
| 0.0175 | 0.022 | −0.004 | 0.040 | −0.004 | 0.019 | −0.015 | −0.002 | 0.000 |
| 0.0200 | 0.024 | −0.004 | 0.050 | −0.005 | 0.022 | −0.016 | −0.002 | 0.000 |
| 0.0225 | 0.026 | −0.004 | 0.060 | −0.005 | 0.024 | −0.018 | −0.003 | 0.000 |
| 0.0250 | 0.028 | −0.005 | 0.060 | −0.006 | 0.026 | −0.019 | −0.003 | 0.000 |
| 0.0275 | 0.029 | −0.005 | 0.070 | −0.007 | 0.028 | −0.021 | −0.003 | 0.000 |
| 0.0300 | 0.030 | −0.005 | 0.080 | −0.007 | 0.031 | −0.022 | −0.004 | 0.000 |
| 0.0325 | 0.031 | −0.006 | 0.080 | −0.008 | 0.033 | −0.023 | −0.004 | 0.000 |
| 0.0350 | 0.032 | −0.006 | 0.090 | −0.009 | 0.035 | −0.025 | −0.005 | 0.000 |
| 0.0375 | 0.033 | −0.006 | 0.090 | −0.010 | 0.036 | −0.026 | −0.005 | 0.001 |
| 0.0400 | 0.033 | −0.007 | 0.100 | −0.010 | 0.038 | −0.027 | −0.005 | 0.001 |
| 0.0425 | 0.034 | −0.007 | 0.100 | −0.011 | 0.040 | −0.028 | −0.006 | 0.001 |
| 0.0450 | 0.034 | −0.007 | 0.110 | −0.012 | 0.041 | −0.029 | −0.006 | 0.002 |
| 0.0475 | 0.034 | −0.007 | 0.110 | −0.013 | 0.043 | −0.029 | −0.006 | 0.002 |
| 0.0500 | 0.034 | −0.007 | 0.110 | −0.014 | 0.044 | −0.030 | −0.006 | 0.003 |
| 0.0525 | 0.034 | −0.007 | 0.120 | −0.015 | 0.045 | −0.031 | −0.006 | 0.003 |
| 0.0550 | 0.034 | −0.007 | 0.120 | −0.016 | 0.046 | −0.031 | −0.006 | 0.004 |
| 0.0575 | 0.034 | −0.008 | 0.120 | −0.017 | 0.047 | −0.032 | −0.006 | 0.005 |
| 0.0600 | 0.034 | −0.008 | 0.120 | −0.018 | 0.048 | −0.032 | −0.006 | 0.006 |
| 0.0625 | 0.034 | −0.008 | 0.120 | −0.019 | 0.048 | −0.032 | −0.006 | 0.007 |
| 0.0650 | 0.034 | −0.008 | 0.130 | −0.020 | 0.048 | −0.032 | −0.005 | 0.008 |
| 0.0675 | 0.033 | −0.008 | 0.130 | −0.022 | 0.049 | −0.032 | −0.005 | 0.010 |
| 0.0700 | 0.033 | −0.008 | 0.130 | −0.023 | 0.049 | −0.032 | −0.004 | 0.011 |
| 0.0725 | 0.033 | −0.008 | 0.120 | −0.025 | 0.049 | −0.032 | −0.004 | 0.013 |
| 0.0750 | 0.033 | 0.007 | 0.120 | −0.026 | 0.049 | −0.032 | −0.003 | 0.015 |

TABLE I-continued

Displacement Data: Horse A
Units: meters

| time (sec) | Vault #1 | | Vault #2 | | Vault #3 | | Vault #4 | |
|---|---|---|---|---|---|---|---|---|
| | x displ. | y displ. | x displ. | y displ. | x displ. | y displ. | x displ. | y displ. |
| 0.0775 | 0.033 | −0.007 | 0.120 | −0.028 | 0.049 | −0.031 | −0.002 | 0.016 |
| 0.0800 | 0.033 | −0.007 | 0.120 | −0.029 | 0.048 | −0.031 | −0.001 | 0.018 |
| 0.0825 | 0.033 | −0.007 | 0.120 | −0.031 | 0.048 | −0.030 | 0.000 | 0.021 |
| 0.0850 | 0.033 | −0.007 | 0.120 | −0.032 | 0.048 | −0.029 | 0.001 | 0.023 |
| 0.0875 | 0.033 | −0.006 | 0.110 | −0.034 | 0.048 | −0.028 | 0.002 | 0.026 |
| 0.0900 | 0.032 | −0.006 | 0.110 | −0.035 | 0.047 | −0.028 | 0.004 | 0.028 |
| 0.0925 | 0.032 | −0.006 | 0.110 | −0.036 | 0.047 | −0.027 | 0.005 | 0.031 |
| 0.0950 | 0.032 | −0.005 | 0.100 | −0.037 | 0.047 | −0.026 | 0.007 | 0.034 |
| 0.0975 | 0.032 | −0.005 | 0.100 | −0.038 | 0.046 | −0.024 | 0.008 | 0.036 |
| 0.1000 | 0.032 | −0.004 | 0.090 | −0.039 | 0.046 | −0.023 | 0.010 | 0.039 |
| 0.1025 | 0.032 | −0.004 | 0.090 | −0.039 | 0.046 | −0.022 | 0.012 | 0.042 |
| 0.1050 | 0.032 | −0.003 | 0.090 | −0.039 | 0.046 | −0.020 | | |
| 0.1075 | 0.032 | −0.002 | 0.080 | −0.039 | 0.045 | −0.018 | | |
| 0.1100 | 0.032 | −0.002 | 0.080 | −0.039 | 0.045 | −0.017 | | |
| 0.1125 | 0.031 | −0.001 | 0.070 | −0.039 | 0.045 | −0.015 | | |
| 0.1150 | 0.031 | 0.000 | 0.070 | −0.038 | 0.045 | −0.013 | | |
| 0.1175 | 0.031 | 0.001 | 0.060 | −0.037 | 0.045 | −0.011 | | |
| 0.1200 | 0.031 | 0.002 | 0.060 | −0.036 | 0.045 | −0.008 | | |
| 0.1225 | 0.031 | 0.003 | 0.050 | −0.034 | 0.045 | −0.006 | | |
| 0.1250 | 0.031 | 0.004 | 0.050 | −0.032 | 0.045 | −0.004 | | |
| 0.1275 | 0.032 | 0.005 | 0.040 | −0.030 | 0.045 | −0.001 | | |
| 0.1300 | 0.032 | 0.006 | 0.040 | −0.028 | 0.045 | 0.002 | | |
| 0.1325 | 0.032 | 0.008 | 0.030 | −0.026 | 0.045 | 0.005 | | |
| 0.1350 | 0.032 | 0.009 | 0.030 | −0.023 | 0.045 | 0.007 | | |
| 0.1375 | 0.032 | 0.010 | 0.020 | −0.020 | 0.046 | 0.010 | | |
| 0.1400 | 0.032 | 0.012 | 0.020 | −0.017 | 0.046 | 0.014 | | |
| 0.1425 | 0.033 | 0.013 | 0.020 | −0.014 | 0.046 | 0.017 | | |
| 0.1450 | 0.033 | 0.014 | 0.010 | −0.010 | 0.046 | 0.020 | | |
| 0.1475 | | | 0.010 | −0.007 | 0.046 | 0.024 | | |
| 0.1500 | | | 0.000 | −0.003 | 0.047 | 0.027 | | |
| 0.1525 | | | 0.000 | 0.000 | 0.047 | 0.031 | | |
| 0.1550 | | | −0.010 | 0.004 | 0.047 | 0.034 | | |
| 0.1575 | | | −0.010 | 0.008 | 0.047 | 0.038 | | |
| 0.1600 | | | | | 0.047 | 0.042 | | |
| 0.1625 | | | | | 0.047 | 0.045 | | |
| 0.1650 | | | | | 0.047 | 0.049 | | |
| 0.1675 | | | | | 0.047 | 0.053 | | |

TABLE II

Displacement Data: Horse B
Units: meters

| time (sec) | Vault #1 | | Vault #2 | | Vault #3 | | Vault #4 | |
|---|---|---|---|---|---|---|---|---|
| | x displ | y displ | x displ | y displ | x displ | y displ | x displ | y displ |
| −0.1050 | −0.162 | 0.107 | −0.171 | 0.120 | −0.103 | 0.076 | −0.138 | 0.089 |
| −0.1025 | −0.153 | 0.101 | −0.161 | 0.115 | −0.096 | 0.070 | −0.129 | 0.084 |
| −0.1000 | −0.143 | 0.096 | −0.151 | 0.110 | −0.089 | 0.065 | −0.121 | 0.079 |
| −0.0975 | −0.135 | 0.090 | −0.141 | 0.104 | −0.083 | 0.059 | −0.112 | 0.074 |
| −0.0950 | −0.126 | 0.084 | −0.131 | 0.099 | −0.076 | 0.054 | −0.104 | 0.069 |
| −0.0925 | −0.117 | 0.079 | −0.122 | 0.093 | −0.070 | 0.049 | −0.096 | 0.065 |
| −0.0900 | −0.109 | 0.073 | −0.112 | 0.088 | −0.064 | 0.044 | −0.088 | 0.060 |
| −0.0875 | −0.101 | 0.068 | −0.103 | 0.082 | −0.058 | 0.040 | −0.081 | 0.055 |
| −0.0850 | −0.093 | 0.062 | −0.094 | 0.077 | −0.053 | 0.035 | −0.073 | 0.050 |
| −0.0825 | −0.086 | 0.057 | −0.086 | 0.071 | −0.048 | 0.031 | −0.067 | 0.046 |
| −0.0800 | −0.078 | 0.052 | −0.078 | 0.066 | −0.043 | 0.028 | −0.060 | 0.042 |
| −0.0775 | −0.071 | 0.047 | −0.070 | 0.060 | −0.038 | 0.024 | −0.054 | 0.037 |
| −0.0750 | −0.065 | 0.042 | −0.062 | 0.055 | −0.034 | 0.021 | −0.048 | 0.033 |
| −0.0725 | −0.058 | 0.037 | −0.055 | 0.050 | −0.030 | 0.018 | −0.042 | 0.030 |
| −0.0700 | −0.052 | 0.033 | −0.049 | 0.045 | −0.026 | 0.015 | −0.037 | 0.026 |
| −0.0675 | −0.046 | 0.029 | −0.043 | 0.040 | −0.022 | 0.013 | −0.032 | 0.023 |
| −0.0650 | −0.041 | 0.025 | −0.037 | 0.035 | −0.019 | 0.011 | −0.028 | 0.020 |
| −0.0625 | −0.036 | 0.021 | −0.032 | 0.031 | −0.016 | 0.009 | −0.024 | 0.017 |
| −0.0600 | −0.031 | 0.018 | −0.027 | 0.027 | −0.014 | 0.007 | −0.020 | 0.014 |
| −0.0575 | −0.027 | 0.015 | −0.023 | 0.023 | −0.012 | 0.006 | −0.017 | 0.012 |
| −0.0550 | −0.023 | 0.012 | −0.019 | 0.019 | −0.010 | 0.005 | −0.014 | 0.010 |
| −0.0525 | −0.019 | 0.010 | −0.016 | 0.016 | −0.008 | 0.004 | −0.011 | 0.008 |
| −0.0500 | −0.016 | 0.008 | −0.013 | 0.013 | −0.006 | 0.003 | −0.009 | 0.007 |

TABLE II-continued

Displacement Data: Horse B
Units: meters

| | Vault #1 | | Vault #2 | | Vault #3 | | Vault #4 | |
|---|---|---|---|---|---|---|---|---|
| time (sec) | x displ | y displ | x displ | y displ | x displ | y displ | x displ | y displ |
| −0.0475 | −0.013 | 0.006 | −0.010 | 0.011 | −0.005 | 0.002 | −0.007 | 0.005 |
| −0.0450 | −0.010 | 0.005 | −0.008 | 0.009 | −0.004 | 0.002 | −0.005 | 0.004 |
| −0.0425 | −0.008 | 0.004 | −0.006 | 0.007 | −0.003 | 0.001 | −0.004 | 0.003 |
| −0.0400 | −0.006 | 0.003 | −0.005 | 0.005 | −0.002 | 0.001 | −0.003 | 0.002 |
| −0.0375 | −0.005 | 0.002 | −0.004 | 0.004 | −0.002 | 0.001 | −0.002 | 0.002 |
| −0.0350 | −0.003 | 0.001 | −0.003 | 0.003 | −0.001 | 0.000 | −0.001 | 0.001 |
| −0.0325 | −0.002 | 0.001 | −0.002 | 0.002 | −0.001 | 0.000 | 0.000 | 0.001 |
| −0.0300 | −0.001 | 0.000 | −0.001 | 0.001 | −0.001 | 0.000 | 0.000 | 0.000 |
| −0.0275 | −0.001 | 0.000 | −0.001 | 0.001 | 0.000 | 0.000 | 0.000 | 0.000 |
| −0.0250 | −0.001 | 0.000 | −0.001 | 0.000 | 0.000 | 0.000 | 0.000 | 0.000 |
| −0.0225 | 0.000 | 0.000 | 0.000 | 0.000 | 0.000 | 0.000 | 0.000 | 0.000 |
| −0.0200 | 0.000 | 0.000 | 0.000 | 0.000 | 0.000 | 0.000 | 0.000 | 0.000 |
| −0.0175 | 0.000 | 0.000 | −0.001 | 0.000 | 0.000 | 0.000 | 0.000 | 0.000 |
| −0.0150 | 0.000 | 0.000 | −0.001 | 0.000 | 0.000 | 0.000 | 0.000 | 0.000 |
| −0.0125 | −0.001 | 0.000 | −0.001 | 0.000 | 0.000 | 0.000 | 0.000 | 0.000 |
| −0.0100 | −0.001 | 0.000 | −0.001 | 0.000 | 0.000 | 0.000 | 0.000 | 0.000 |
| −0.0075 | −0.001 | 0.000 | −0.002 | 0.000 | −0.001 | 0.000 | 0.000 | 0.000 |
| −0.0050 | −0.001 | 0.000 | −0.002 | 0.000 | −0.001 | 0.000 | 0.000 | 0.000 |
| −0.0025 | −0.002 | 0.000 | −0.002 | 0.000 | −0.001 | 0.000 | 0.000 | 0.000 |
| 0.0000 | −0.002 | 0.000 | −0.003 | 0.000 | −0.001 | 0.000 | −0.001 | 0.000 |
| 0.0025 | −0.002 | 0.000 | −0.003 | 0.000 | −0.001 | 0.000 | −0.001 | 0.000 |
| 0.0050 | −0.003 | 0.000 | −0.004 | 0.000 | −0.002 | 0.000 | −0.001 | 0.000 |
| 0.0075 | −0.003 | 0.000 | −0.004 | 0.001 | −0.002 | 0.000 | −0.001 | 0.000 |
| 0.0100 | −0.004 | 0.000 | −0.004 | 0.001 | −0.002 | 0.000 | −0.001 | 0.000 |
| 0.0125 | −0.004 | 0.000 | −0.005 | 0.001 | −0.002 | 0.000 | −0.001 | 0.000 |
| 0.0150 | −0.004 | 0.000 | −0.005 | 0.001 | −0.003 | 0.000 | −0.001 | 0.000 |
| 0.0175 | −0.005 | 0.000 | −0.005 | 0.002 | −0.003 | 0.000 | −0.001 | 0.001 |
| 0.0200 | −0.005 | 0.000 | −0.006 | 0.002 | −0.003 | 0.000 | −0.002 | 0.001 |
| 0.0225 | −0.005 | 0.000 | −0.006 | 0.002 | −0.003 | 0.000 | −0.002 | 0.001 |
| 0.0250 | −0.006 | 0.000 | −0.006 | 0.003 | −0.004 | 0.000 | −0.002 | 0.001 |
| 0.0275 | −0.006 | 0.000 | −0.006 | 0.003 | −0.004 | 0.000 | −0.002 | 0.001 |
| 0.0300 | −0.006 | 0.000 | −0.006 | 0.003 | −0.004 | 0.001 | −0.002 | 0.001 |
| 0.0325 | −0.006 | 0.001 | −0.006 | 0.004 | −0.004 | 0.001 | −0.002 | 0.001 |
| 0.0350 | −0.007 | 0.001 | −0.006 | 0.004 | −0.004 | 0.001 | −0.002 | 0.001 |
| 0.0375 | −0.007 | 0.001 | −0.006 | 0.005 | −0.004 | 0.001 | −0.002 | 0.001 |
| 0.0400 | −0.007 | 0.001 | −0.006 | 0.005 | −0.004 | 0.002 | −0.002 | 0.002 |
| 0.0425 | −0.007 | 0.001 | −0.006 | 0.006 | −0.004 | 0.002 | −0.002 | 0.002 |
| 0.0450 | −0.007 | 0.002 | −0.006 | 0.006 | −0.004 | 0.003 | −0.002 | 0.002 |
| 0.0475 | −0.008 | 0.002 | −0.006 | 0.007 | −0.004 | 0.003 | −0.003 | 0.002 |
| 0.0500 | −0.008 | 0.002 | −0.006 | 0.008 | −0.004 | 0.004 | −0.003 | 0.002 |
| 0.0525 | −0.008 | 0.003 | −0.006 | 0.009 | −0.004 | 0.004 | −0.003 | 0.002 |
| 0.0550 | −0.008 | 0.003 | −0.006 | 0.009 | −0.004 | 0.005 | −0.003 | 0.003 |
| 0.0575 | −0.008 | 0.003 | −0.005 | 0.011 | −0.004 | 0.006 | −0.003 | 0.003 |
| 0.0600 | −0.008 | 0.004 | −0.005 | 0.012 | −0.004 | 0.007 | −0.003 | 0.003 |
| 0.0625 | −0.008 | 0.004 | −0.005 | 0.013 | −0.004 | 0.008 | −0.003 | 0.003 |
| 0.0650 | −0.008 | 0.005 | −0.004 | 0.014 | −0.003 | 0.009 | −0.003 | 0.003 |
| 0.0675 | −0.008 | 0.005 | −0.004 | 0.016 | −0.003 | 0.011 | −0.003 | 0.003 |
| 0.0700 | −0.008 | 0.006 | −0.003 | 0.017 | −0.002 | 0.012 | −0.002 | 0.004 |
| 0.0725 | −0.008 | 0.006 | −0.003 | 0.019 | −0.002 | 0.014 | −0.002 | 0.004 |
| 0.0750 | −0.008 | 0.007 | −0.002 | 0.021 | −0.001 | 0.016 | −0.002 | 0.005 |
| 0.0775 | −0.008 | 0.008 | −0.002 | 0.024 | −0.001 | 0.018 | 0.002 | 0.005 |
| 0.0800 | −0.008 | 0.009 | −0.001 | 0.026 | 0.000 | 0.020 | −0.001 | 0.006 |
| 0.0825 | −0.008 | 0.010 | −0.001 | 0.028 | 0.001 | 0.023 | −0.001 | 0.007 |
| 0.0850 | −0.008 | 0.011 | 0.000 | 0.031 | 0.001 | 0.025 | −0.001 | 0.007 |
| 0.0875 | −0.007 | 0.012 | 0.000 | 0.034 | 0.002 | 0.028 | 0.000 | 0.009 |
| 0.0900 | −0.007 | 0.014 | 0.001 | 0.037 | 0.003 | 0.031 | 0.000 | 0.010 |
| 0.0925 | −0.007 | 0.015 | 0.001 | 0.040 | 0.004 | 0.034 | 0.001 | 0.011 |
| 0.0950 | −0.006 | 0.017 | 0.002 | 0.043 | 0.005 | 0.037 | 0.002 | 0.013 |
| 0.0975 | −0.006 | 0.019 | 0.002 | 0.046 | 0.006 | 0.040 | 0.002 | 0.015 |
| 0.1000 | −0.005 | 0.021 | 0.003 | 0.050 | 0.007 | 0.044 | 0.003 | 0.016 |
| 0.1025 | −0.005 | 0.023 | 0.004 | 0.053 | 0.008 | 0.047 | 0.004 | 0.019 |
| 0.1050 | −0.004 | 0.026 | 0.004 | 0.057 | −0.001 | 0.016 | 0.005 | 0.021 |
| 0.1075 | −0.004 | 0.028 | 0.005 | 0.060 | −0.001 | 0.018 | 0.006 | 0.024 |
| 0.1100 | −0.003 | 0.031 | | | 0.000 | 0.020 | 0.007 | 0.027 |
| 0.1125 | −0.002 | 0.033 | | | 0.001 | 0.023 | 0.009 | 0.030 |
| 0.1150 | −0.002 | 0.036 | | | 0.001 | 0.025 | 0.010 | 0.033 |
| 0.1175 | −0.001 | 0.039 | | | 0.002 | 0.028 | 0.012 | 0.037 |
| 0.1200 | −0.001 | 0.042 | | | 0.003 | 0.031 | 0.013 | 0.040 |
| 0.1225 | −0.003 | 0.031 | | | 0.004 | 0.034 | 0.015 | 0.044 |
| 0.1250 | −0.002 | 0.033 | | | 0.005 | 0.037 | 0.016 | 0.048 |
| 0.1275 | −0.002 | 0.036 | | | 0.006 | 0.040 | 0.018 | 0.053 |
| 0.1300 | −0.001 | 0.039 | | | 0.007 | 0.044 | 0.019 | 0.057 |

TABLE II-continued

Displacement Data: Horse B
Units: meters

| time (sec) | Vault #1 x displ | Vault #1 y displ | Vault #2 x displ | Vault #2 y displ | Vault #3 x displ | Vault #3 y displ | Vault #4 x displ | Vault #4 y displ |
|---|---|---|---|---|---|---|---|---|
| 0.1325 | −0.001 | 0.042 | | | 0.008 | 0.047 | 0.002 | 0.015 |
| 0.1350 | | | | | | | 0.003 | 0.016 |
| 0.1375 | | | | | | | 0.004 | 0.019 |
| 0.1400 | | | | | | | 0.005 | 0.021 |
| 0.1425 | | | | | | | 0.006 | 0.024 |
| 0.1450 | | | | | | | 0.007 | 0.027 |
| 0.1475 | | | | | | | 0.009 | 0.030 |
| 0.1500 | | | | | | | 0.010 | 0.033 |
| 0.1525 | | | | | | | 0.012 | 0.037 |
| 0.1550 | | | | | | | 0.013 | 0.040 |
| 0.1575 | | | | | | | 0.015 | 0.044 |
| 0.1600 | | | | | | | 0.016 | 0.048 |
| 0.1625 | | | | | | | 0.018 | 0.053 |
| 0.1650 | | | | | | | 0.019 | 0.057 |

TABLE III

Velocity Data: Horse A
Units: meters/sec.

| time | Vault #1 x comp. | Vault #1 y comp. | Vault #1 result. | Vault #2 x comp. | Vault #2 y comp. | Vault #2 result. |
|---|---|---|---|---|---|---|
| −0.1050 | 4.47 | −2.06 | 4.92 | 4.04 | −1.30 | 4.24 |
| −0.1025 | 4.42 | −2.05 | 4.88 | 4.03 | −1.31 | 4.24 |
| −0.1000 | 4.36 | −2.05 | 4.82 | 4.03 | −1.32 | 4.24 |
| −0.0975 | 4.29 | −2.04 | 4.75 | 4.02 | −1.35 | 4.24 |
| −0.0950 | 4.20 | −2.02 | 4.67 | 4.01 | −1.37 | 4.24 |
| −0.0925 | 4.11 | −2.01 | 4.57 | 3.99 | −1.41 | 4.23 |
| −0.0900 | 4.00 | −1.99 | 4.47 | 3.96 | −1.45 | 4.22 |
| −0.0875 | 3.89 | −1.97 | 4.36 | 3.94 | −1.49 | 4.21 |
| −0.0850 | 3.76 | −1.94 | 4.24 | 3.90 | −1.54 | 4.20 |
| −0.0825 | 3.64 | −1.92 | 4.11 | 3.87 | −1.59 | 4.18 |
| −0.0800 | 3.51 | −1.89 | 3.99 | 3.83 | −1.64 | 4.16 |
| −0.0775 | 3.38 | −1.86 | 3.86 | 3.78 | −1.68 | 4.14 |
| −0.0750 | 3.25 | −1.83 | 3.73 | 3.73 | −1.73 | 4.11 |
| −0.0725 | 3.13 | −1.79 | 3.60 | 3.67 | −1.77 | 4.08 |
| −0.0700 | 3.00 | −1.76 | 3.48 | 3.61 | −1.81 | 4.04 |
| −0.0675 | 2.89 | −1.72 | 3.36 | 3.54 | −1.84 | 3.99 |
| −0.0650 | 2.78 | −1.68 | 3.25 | 3.48 | −1.86 | 3.94 |
| −0.0625 | 2.69 | −1.65 | 3.15 | 3.41 | −1.88 | 3.89 |
| −0.0600 | 2.61 | −1.62 | 3.07 | 3.33 | −1.88 | 3.83 |
| −0.0575 | 2.55 | −1.59 | 3.01 | 3.26 | −1.87 | 3.76 |
| −0.0550 | 2.51 | −1.56 | 2.96 | 3.19 | −1.85 | 3.69 |
| −0.0525 | 2.48 | −1.53 | 2.91 | 3.12 | −1.82 | 3.61 |
| −0.0500 | 2.46 | −1.49 | 2.88 | 3.05 | −1.77 | 3.53 |
| −0.0475 | 2.44 | −1.46 | 2.84 | 2.98 | −1.72 | 3.44 |
| −0.0450 | 2.43 | −1.41 | 2.81 | 2.92 | −1.65 | 3.35 |
| −0.0425 | 2.42 | −1.36 | 2.78 | 2.86 | −1.57 | 3.26 |
| −0.0400 | 2.41 | −1.31 | 2.74 | 2.80 | −1.47 | 3.17 |
| −0.0375 | 2.40 | −1.24 | 2.70 | 2.75 | −1.37 | 3.07 |
| −0.0350 | 2.38 | −1.17 | 2.66 | 2.70 | −1.27 | 2.98 |
| −0.0325 | 2.36 | −1.10 | 2.61 | 2.66 | −1.16 | 2.90 |
| −0.0300 | 2.34 | −1.02 | 2.55 | 2.62 | −1.05 | 2.82 |
| −0.0275 | 2.31 | −0.93 | 2.49 | 2.59 | −0.94 | 2.75 |
| −0.0250 | 2.27 | −0.85 | 2.42 | 2.56 | −0.84 | 2.69 |
| −0.0225 | 2.22 | −0.77 | 2.35 | 2.54 | −0.74 | 2.64 |
| −0.0200 | 2.17 | −0.69 | 2.28 | 2.52 | −0.65 | 2.60 |
| −0.0175 | 2.11 | −0.62 | 2.20 | 2.51 | −0.57 | 2.57 |
| −0.0150 | 2.05 | −0.55 | 2.12 | 2.50 | −0.50 | 2.55 |
| −0.0125 | 1.98 | −0.49 | 2.04 | 2.50 | −0.44 | 2.54 |
| −0.0100 | 1.91 | −0.44 | 1.96 | 2.51 | −0.39 | 2.54 |
| −0.0075 | 1.84 | −0.39 | 1.88 | 2.51 | −0.34 | 2.54 |
| −0.0050 | 1.76 | −0.35 | 1.80 | 2.52 | −0.31 | 2.54 |
| −0.0025 | 1.68 | −0.32 | 1.71 | 2.54 | −0.28 | 2.55 |
| 0.0000 | 1.60 | −0.28 | 1.62 | 2.55 | −0.26 | 2.57 |
| 0.0025 | 1.51 | −0.25 | 1.53 | 2.57 | −0.25 | 2.58 |
| 0.0050 | 1.41 | −0.23 | 1.43 | 2.58 | −0.24 | 2.59 |
| 0.0075 | 1.32 | −0.21 | 1.33 | 2.59 | −0.23 | 2.60 |
| 0.0100 | 1.22 | −0.19 | 1.23 | 2.60 | −0.23 | 2.61 |
| 0.0125 | 1.12 | −0.18 | 1.13 | 2.60 | −0.23 | 2.61 |
| 0.0150 | 1.02 | −0.17 | 1.03 | 2.59 | −0.24 | 2.60 |
| 0.0175 | 0.92 | −0.16 | 0.93 | 2.58 | −0.25 | 2.59 |
| 0.0200 | 0.82 | −0.16 | 0.84 | 2.55 | −0.25 | 2.56 |
| 0.0225 | 0.72 | −0.15 | 0.74 | 2.51 | −0.26 | 2.53 |
| 0.0250 | 0.63 | −0.15 | 0.65 | 2.47 | −0.27 | 2.48 |
| 0.0275 | 0.54 | −0.14 | 0.56 | 2.40 | −0.27 | 2.42 |
| 0.0300 | 0.45 | −0.13 | 0.47 | 2.33 | −0.28 | 2.35 |
| 0.0325 | 0.37 | −0.13 | 0.39 | 2.24 | −0.29 | 2.26 |
| 0.0350 | 0.30 | −0.12 | 0.32 | 2.14 | −0.29 | 2.16 |
| 0.0375 | 0.23 | −0.10 | 0.25 | 2.03 | −0.30 | 2.06 |
| 0.0400 | 0.17 | −0.09 | 0.19 | 1.91 | −0.31 | 1.93 |
| 0.0425 | 0.12 | −0.08 | 0.14 | 1.77 | −0.32 | 1.80 |
| 0.0450 | 0.07 | −0.07 | 0.10 | 1.62 | −0.34 | 1.66 |
| 0.0475 | 0.04 | −0.06 | 0.07 | 1.47 | −0.35 | 1.51 |
| 0.0500 | 0.00 | −0.05 | 0.05 | 1.30 | −0.37 | 1.35 |
| 0.0525 | −0.02 | −0.04 | 0.04 | 1.13 | −0.40 | 1.19 |
| 0.0550 | −0.04 | −0.03 | 0.05 | 0.95 | −0.42 | 1.04 |
| 0.0575 | −0.05 | −0.02 | 0.05 | 0.76 | −0.45 | 0.88 |
| 0.0600 | −0.06 | −0.02 | 0.06 | 0.58 | −0.48 | 0.75 |
| 0.0625 | −0.06 | −0.01 | 0.06 | 0.39 | −0.51 | 0.64 |
| 0.0650 | −0.06 | 0.00 | 0.06 | 0.20 | −0.54 | 0.57 |
| 0.0675 | −0.06 | 0.01 | 0.06 | 0.02 | −0.56 | 0.56 |
| 0.0700 | −0.05 | 0.02 | 0.05 | −0.15 | −0.59 | 0.61 |
| 0.0725 | −0.05 | 0.03 | 0.06 | −0.33 | −0.61 | 0.69 |
| 0.0750 | −0.05 | 0.04 | 0.06 | −0.49 | −0.62 | 0.79 |
| 0.0775 | −0.04 | 0.06 | 0.07 | −0.65 | −0.62 | 0.90 |
| 0.0800 | −0.04 | 0.08 | 0.09 | −0.80 | −0.62 | 1.01 |
| 0.0825 | −0.04 | 0.10 | 0.11 | −0.94 | −0.60 | 1.12 |
| 0.0850 | −0.04 | 0.12 | 0.13 | −1.07 | −0.58 | 1.21 |
| 0.0875 | −0.04 | 0.14 | 0.15 | −1.19 | −0.54 | 1.30 |
| 0.0900 | −0.05 | 0.16 | 0.16 | −1.29 | −0.50 | 1.38 |
| 0.0925 | −0.05 | 0.17 | 0.18 | −1.39 | −0.44 | 1.46 |
| 0.0950 | −0.05 | 0.19 | 0.20 | −1.47 | −0.37 | 1.52 |
| 0.0975 | −0.05 | 0.20 | 0.21 | −1.55 | −0.30 | 1.58 |
| 0.1000 | −0.05 | 0.22 | 0.23 | −1.61 | −0.22 | 1.63 |
| 0.1025 | −0.05 | 0.24 | 0.24 | −1.67 | −0.13 | 1.68 |
| 0.1050 | −0.04 | 0.25 | 0.26 | −1.72 | −0.04 | 1.72 |
| 0.1075 | −0.04 | 0.27 | 0.28 | −1.76 | 0.05 | 1.76 |
| 0.1100 | −0.03 | 0.29 | 0.30 | −1.79 | 0.15 | 1.80 |
| 0.1125 | −0.02 | 0.32 | 0.32 | −1.82 | 0.25 | 1.84 |

TABLE III-continued

Velocity Data: Horse A
Units: meters/sec.

| | Vault #1 | | | Vault #2 | | |
|---|---|---|---|---|---|---|
| time | x comp. | y comp. | result. | x comp. | y comp. | result. |
| 0.1150 | −0.01 | 0.34 | 0.34 | −1.85 | 0.35 | 1.88 |
| 0.1175 | 0.00 | 0.36 | 0.36 | −1.87 | 0.46 | 1.93 |
| 0.1200 | 0.01 | 0.39 | 0.39 | −1.89 | 0.56 | 1.97 |
| 0.1225 | 0.02 | 0.41 | 0.42 | −1.91 | 0.66 | 2.02 |
| 0.1250 | 0.03 | 0.44 | 0.44 | −1.92 | 0.76 | 2.06 |
| 0.1275 | 0.05 | 0.46 | 0.47 | −1.93 | 0.86 | 2.11 |
| 0.1300 | 0.06 | 0.49 | 0.49 | −1.94 | 0.95 | 2.16 |
| 0.1325 | 0.07 | 0.51 | 0.52 | −1.94 | 1.04 | 2.2 |
| 0.1350 | 0.07 | 0.53 | 0.54 | −1.95 | 1.12 | 2.25 |
| 0.1375 | 0.08 | 0.55 | 0.55 | −1.96 | 1.19 | 2.29 |
| 0.1400 | 0.08 | 0.56 | 0.57 | −1.96 | 1.26 | 2.33 |
| 0.1425 | 0.08 | 0.57 | 0.58 | −1.97 | 1.32 | 2.37 |
| 0.1450 | 0.08 | 0.58 | 0.58 | −1.97 | 1.37 | 2.4 |
| 0.1475 | | | | −1.97 | 1.42 | 2.43 |
| 0.1500 | | | | −1.97 | 1.45 | 2.45 |
| 0.1525 | | | | −1.97 | 1.47 | 2.46 |
| 0.1550 | | | | −1.98 | 1.49 | 2.47 |
| 0.1575 | | | | −1.98 | 1.5 | 2.48 |

TABLE IV

Velocity Data: Horse A
Units: meters/sec.

| | Vault #3 | | | Vault #4 | | |
|---|---|---|---|---|---|---|
| time | x comp. | y comp. | result. | x comp. | y comp. | result. |
| −0.1050 | 3.17 | −1.41 | 3.47 | 4.00 | −1.49 | 4.27 |
| −0.1025 | 3.25 | −1.48 | 3.57 | 4.00 | −1.50 | 4.27 |
| −0.1000 | 3.34 | −1.54 | 3.68 | 3.99 | −1.50 | 4.26 |
| −0.0975 | 3.42 | −1.61 | 3.78 | 3.98 | −1.50 | 4.25 |
| −0.0950 | 3.50 | −1.68 | 3.88 | 3.96 | −1.51 | 4.24 |
| −0.0925 | 3.57 | −1.75 | 3.98 | 3.94 | −1.51 | 4.22 |
| −0.0900 | 3.63 | −1.82 | 4.06 | 3.92 | −1.51 | 4.20 |
| −0.0875 | 3.68 | −1.88 | 4.13 | 3.89 | −1.52 | 4.17 |
| −0.0850 | 3.71 | −1.94 | 4.19 | 3.85 | −1.52 | 4.14 |
| −0.0825 | 3.74 | −2.00 | 4.24 | 3.80 | −1.52 | 4.09 |
| −0.0800 | 3.75 | −2.05 | 4.28 | 3.75 | −1.51 | 4.04 |
| −0.0775 | 3.76 | −2.10 | 4.30 | 3.69 | −1.50 | 3.98 |
| −0.0750 | 3.75 | −2.15 | 4.32 | 3.61 | −1.49 | 3.91 |
| −0.0725 | 3.73 | −2.19 | 4.33 | 3.53 | −1.46 | 3.83 |
| −0.0700 | 3.70 | −2.23 | 4.32 | 3.44 | −1.43 | 3.73 |
| −0.0675 | 3.66 | −2.27 | 4.30 | 3.34 | −1.40 | 3.62 |
| −0.0650 | 3.61 | −2.30 | 4.28 | 3.24 | −1.35 | 3.51 |
| −0.0625 | 3.55 | −2.33 | 4.24 | 3.12 | −1.29 | 3.38 |
| −0.0600 | 3.48 | −2.35 | 4.20 | 3.00 | −1.23 | 3.24 |
| −0.0575 | 3.41 | −2.37 | 4.15 | 2.87 | −1.15 | 3.09 |
| −0.0550 | 3.33 | −2.38 | 4.09 | 2.73 | −1.07 | 2.93 |
| −0.0525 | 3.24 | −2.39 | 4.03 | 2.59 | −0.99 | 2.77 |
| −0.0500 | 3.16 | −2.40 | 3.96 | 2.45 | −0.90 | 2.61 |
| −0.0475 | 3.07 | −2.40 | 3.89 | 2.30 | −0.80 | 2.44 |
| −0.0450 | 2.98 | −2.39 | 3.82 | 2.15 | −0.71 | 2.26 |
| −0.0425 | 2.88 | −2.38 | 3.74 | 1.99 | −0.62 | 2.09 |
| −0.0400 | 2.79 | −2.36 | 3.65 | 1.84 | −0.54 | 1.92 |
| −0.0375 | 2.69 | −2.33 | 3.56 | 1.68 | −0.46 | 1.74 |
| −0.0350 | 2.60 | −2.29 | 3.46 | 1.52 | −0.39 | 1.57 |
| −0.0325 | 2.50 | −2.25 | 3.36 | 1.37 | −0.32 | 1.40 |
| −0.0300 | 2.41 | −2.19 | 3.26 | 1.21 | −0.26 | 1.24 |
| −0.0275 | 2.31 | −2.13 | 3.14 | 1.06 | −0.21 | 1.08 |
| −0.0250 | 2.21 | −2.06 | 3.02 | 0.92 | −0.17 | 0.93 |
| −0.0225 | 2.12 | −1.98 | 2.90 | 0.78 | −0.14 | 0.79 |
| −0.0200 | 2.02 | −1.89 | 2.77 | 0.65 | −0.11 | 0.66 |
| −0.0175 | 1.93 | −1.80 | 2.64 | 0.53 | −0.09 | 0.54 |
| −0.0150 | 1.84 | −1.70 | 2.50 | 0.42 | −0.07 | 0.43 |
| −0.0125 | 1.75 | −1.59 | 2.37 | 0.33 | −0.06 | 0.33 |
| −0.0100 | 1.66 | −1.49 | 2.23 | 0.24 | −0.05 | 0.24 |
| −0.0075 | 1.58 | −1.39 | 2.10 | 0.16 | −0.04 | 0.17 |

TABLE IV-continued

Velocity Data: Horse A
Units: meters/sec.

| | Vault #3 | | | Vault #4 | | |
|---|---|---|---|---|---|---|
| time | x comp. | y comp. | result. | x comp. | y comp. | result. |
| −0.0050 | 1.50 | −1.29 | 1.98 | 0.10 | −0.04 | 0.10 |
| −0.0025 | 1.42 | −1.20 | 1.86 | 0.04 | −0.04 | 0.06 |
| 0.0000 | 1.35 | −1.11 | 1.74 | −0.01 | −0.04 | 0.04 |
| 0.0025 | 1.28 | −1.03 | 1.64 | −0.05 | −0.03 | 0.06 |
| 0.0050 | 1.21 | −0.96 | 1.55 | −0.08 | −0.03 | 0.08 |
| 0.0075 | 1.16 | −0.89 | 1.46 | −0.10 | −0.03 | 0.11 |
| 0.0100 | 1.10 | −0.83 | 1.38 | −0.12 | −0.02 | 0.13 |
| 0.0125 | 1.06 | −0.78 | 1.32 | −0.14 | −0.02 | 0.14 |
| 0.0150 | 1.02 | −0.74 | 1.26 | −0.15 | −0.01 | 0.15 |
| 0.0175 | 0.98 | −0.70 | 1.20 | −0.16 | −0.01 | 0.16 |
| 0.0200 | 0.95 | −0.66 | 1.16 | −0.16 | 0.00 | 0.16 |
| 0.0225 | 0.92 | −0.63 | 1.12 | −0.17 | 0.01 | 0.17 |
| 0.0250 | 0.90 | −0.60 | 1.08 | −0.17 | 0.02 | 0.17 |
| 0.0275 | 0.88 | −0.57 | 1.05 | −0.17 | 0.03 | 0.17 |
| 0.0300 | 0.85 | −0.55 | 1.01 | −0.16 | 0.04 | 0.17 |
| 0.0325 | 0.83 | −0.52 | 0.98 | −0.16 | 0.06 | 0.17 |
| 0.0350 | 0.80 | −0.49 | 0.94 | −0.15 | 0.07 | 0.17 |
| 0.0375 | 0.76 | −0.47 | 0.89 | −0.14 | 0.09 | 0.17 |
| 0.0400 | 0.73 | −0.44 | 0.85 | −0.13 | 0.12 | 0.17 |
| 0.0425 | 0.69 | −0.41 | 0.80 | −0.11 | 0.14 | 0.18 |
| 0.0450 | 0.64 | −0.38 | 0.74 | −0.09 | 0.17 | 0.20 |
| 0.0475 | 0.59 | −0.34 | 0.68 | −0.06 | 0.21 | 0.22 |
| 0.0500 | 0.53 | −0.31 | 0.62 | −0.04 | 0.24 | 0.25 |
| 0.0525 | 0.47 | −0.27 | 0.55 | −0.01 | 0.28 | 0.28 |
| 0.0550 | 0.41 | −0.23 | 0.47 | 0.02 | 0.32 | 0.32 |
| 0.0575 | 0.35 | −0.19 | 0.40 | 0.05 | 0.37 | 0.37 |
| 0.0600 | 0.29 | −0.14 | 0.32 | 0.08 | 0.41 | 0.42 |
| 0.0625 | 0.22 | −0.10 | 0.25 | 0.12 | 0.46 | 0.48 |
| 0.0650 | 0.17 | −0.05 | 0.18 | 0.15 | 0.51 | 0.54 |
| 0.0675 | 0.11 | −0.01 | 0.11 | 0.19 | 0.57 | 0.60 |
| 0.0700 | 0.07 | 0.03 | 0.07 | 0.23 | 0.62 | 0.66 |
| 0.0725 | 0.02 | 0.08 | 0.08 | 0.27 | 0.68 | 0.73 |
| 0.0750 | −0.01 | 0.11 | 0.12 | 0.32 | 0.74 | 0.80 |
| 0.0775 | −0.04 | 0.15 | 0.16 | 0.36 | 0.80 | 0.87 |
| 0.0800 | −0.07 | 0.19 | 0.20 | 0.40 | 0.85 | 0.94 |
| 0.0825 | −0.09 | 0.22 | 0.24 | 0.44 | 0.91 | 1.01 |
| 0.0850 | −0.10 | 0.26 | 0.28 | 0.49 | 0.97 | 1.08 |
| 0.0875 | −0.11 | 0.29 | 0.32 | 0.53 | 1.02 | 1.15 |
| 0.0900 | −0.12 | 0.33 | 0.35 | 0.57 | 1.06 | 1.20 |
| 0.0925 | −0.13 | 0.37 | 0.39 | 0.60 | 1.10 | 1.26 |
| 0.0950 | −0.13 | 0.41 | 0.43 | 0.63 | 1.13 | 1.30 |
| 0.0975 | −0.12 | 0.46 | 0.47 | 0.66 | 1.16 | 1.33 |
| 0.1000 | −0.12 | 0.50 | 0.52 | 0.67 | 1.17 | 1.35 |
| 0.1025 | −0.11 | 0.55 | 0.56 | 0.68 | 1.18 | 1.36 |
| 0.1050 | −0.10 | 0.59 | 0.60 | | | |
| 0.1075 | −0.09 | 0.64 | 0.65 | | | |
| 0.1100 | −0.08 | 0.69 | 0.69 | | | |
| 0.1125 | −0.06 | 0.73 | 0.74 | | | |
| 0.1150 | −0.05 | 0.78 | 0.78 | | | |
| 0.1175 | −0.03 | 0.83 | 0.83 | | | |
| 0.1200 | −0.01 | 0.87 | 0.87 | | | |
| 0.1225 | 0.00 | 0.92 | 0.92 | | | |
| 0.1250 | 0.02 | 0.96 | 0.97 | | | |
| 0.1275 | 0.03 | 1.01 | 1.01 | | | |
| 0.1300 | 0.05 | 1.06 | 1.06 | | | |
| 0.1325 | 0.06 | 1.1 | 1.1 | | | |
| 0.1350 | 0.07 | 1.15 | 1.15 | | | |
| 0.1375 | 0.07 | 1.19 | 1.19 | | | |
| 0.1400 | 0.07 | 1.23 | 1.23 | | | |
| 0.1425 | 0.08 | 1.27 | 1.27 | | | |
| 0.1450 | 0.07 | 1.3 | 1.31 | | | |
| 0.1475 | 0.07 | 1.34 | 1.34 | | | |
| 0.1500 | 0.06 | 1.37 | 1.37 | | | |
| 0.1525 | 0.05 | 1.4 | 1.4 | | | |
| 0.1550 | 0.05 | 1.43 | 1.43 | | | |
| 0.1575 | 0.04 | 1.46 | 1.46 | | | |
| 0.1600 | 0.03 | 1.48 | 1.48 | | | |
| 0.1625 | 0.02 | 1.5 | 1.5 | | | |
| 0.1650 | 0.02 | 1.51 | 1.51 | | | |
| 0.1675 | 0.01 | 1.52 | 1.52 | | | |

TABLE IV-continued

Velocity Data: Horse A
Units: meters/sec.

| | Vault #3 | | | Vault #4 | | |
|---|---|---|---|---|---|---|
| time | x comp. | y comp. | result. | x comp. | y comp. | result. |
| 0.1700 | 0.01 | 1.53 | 1.53 | | | |

TABLE V

Velicity Data: Horse B
Units: meters/sec.

| | Vault #1 | | | Vault #2 | | |
|---|---|---|---|---|---|---|
| time | x comp. | y comp. | result. | x comp. | y comp. | result. |
| −0.0850 | 3.64 | −1.95 | 4.13 | 2.83 | −2.24 | 3.61 |
| −0.0825 | 3.55 | −1.96 | 4.06 | 2.76 | −2.20 | 3.53 |
| −0.0800 | 3.46 | −1.97 | 3.98 | 2.69 | −2.15 | 3.45 |
| −0.0775 | 3.36 | −1.96 | 3.89 | 2.61 | −2.09 | 3.35 |
| −0.0750 | 3.26 | −1.95 | 3.80 | 2.53 | −2.03 | 3.24 |
| −0.0725 | 3.15 | −1.94 | 3.70 | 2.44 | −1.95 | 3.13 |
| −0.0700 | 3.04 | −1.91 | 3.59 | 2.35 | −1.87 | 3.00 |
| −0.0675 | 2.93 | −1.88 | 3.47 | 2.25 | −1.78 | 2.87 |
| −0.0650 | 2.80 | −1.83 | 3.35 | 2.15 | −1.68 | 2.73 |
| −0.0625 | 2.68 | −1.78 | 3.22 | 2.04 | −1.58 | 2.58 |
| −0.0600 | 2.55 | −1.71 | 3.07 | 1.93 | −1.47 | 2.43 |
| −0.0575 | 2.42 | −1.64 | 2.92 | 1.82 | −1.36 | 2.27 |
| −0.0550 | 2.28 | −1.56 | 2.77 | 1.70 | −1.24 | 2.10 |
| −0.0525 | 2.15 | −1.47 | 2.60 | 1.58 | −1.13 | 1.94 |
| −0.0500 | 2.00 | −1.37 | 2.43 | 1.45 | −1.01 | 1.77 |
| −0.0475 | 1.86 | −1.27 | 2.25 | 1.32 | −0.90 | 1.60 |
| −0.0450 | 1.71 | −1.17 | 2.07 | 1.20 | −0.80 | 1.44 |
| −0.0425 | 1.57 | −1.06 | 1.89 | 1.07 | −0.70 | 1.28 |
| −0.0400 | 1.42 | −0.96 | 1.71 | 0.95 | −0.61 | 1.13 |
| −0.0375 | 1.27 | −0.86 | 1.54 | 0.83 | −0.52 | 0.98 |
| −0.0350 | 1.13 | −0.77 | 1.36 | 0.73 | −0.44 | 0.85 |
| −0.0325 | 0.99 | −0.68 | 1.20 | 0.63 | −0.36 | 0.72 |
| −0.0300 | 0.85 | −0.59 | 1.04 | 0.54 | −0.29 | 0.62 |
| −0.0275 | 0.73 | −0.51 | 0.89 | 0.46 | −0.23 | 0.52 |
| −0.0250 | 0.61 | −0.43 | 0.75 | 0.39 | −0.18 | 0.43 |
| −0.0225 | 0.50 | −0.36 | 0.62 | 0.33 | −0.14 | 0.36 |
| −0.0200 | 0.41 | −0.30 | 0.50 | 0.27 | −0.10 | 0.29 |
| −0.0175 | 0.32 | −0.24 | 0.40 | 0.22 | −0.08 | 0.24 |
| −0.0150 | 0.24 | −0.19 | 0.31 | 0.18 | −0.05 | 0.19 |
| −0.0125 | 0.18 | −0.14 | 0.23 | 0.14 | −0.04 | 0.15 |
| −0.0100 | 0.12 | −0.11 | 0.17 | 0.11 | −0.02 | 0.11 |
| −0.0075 | 0.08 | −0.08 | 0.11 | 0.08 | −0.02 | 0.08 |
| −0.0050 | 0.04 | −0.05 | 0.07 | 0.05 | −0.01 | 0.05 |
| −0.0025 | 0.02 | −0.03 | 0.04 | 0.03 | −0.01 | 0.03 |
| 0.0000 | −0.01 | −0.02 | 0.02 | 0.01 | −0.01 | 0.01 |
| 0.0025 | −0.02 | −0.01 | 0.03 | −0.01 | −0.01 | 0.02 |
| 0.0050 | −0.04 | 0.00 | 0.04 | −0.03 | −0.01 | 0.03 |
| 0.0075 | −0.05 | 0.01 | 0.05 | −0.04 | −0.01 | 0.05 |
| 0.0100 | −0.05 | 0.01 | 0.06 | −0.06 | −0.02 | 0.06 |
| 0.0125 | −0.06 | 0.02 | 0.06 | −0.07 | −0.01 | 0.07 |
| 0.0150 | −0.06 | 0.02 | 0.06 | −0.08 | −0.01 | 0.08 |
| 0.0175 | −0.06 | 0.02 | 0.07 | −0.09 | −0.01 | 0.09 |
| 0.0200 | −0.06 | 0.02 | 0.07 | −0.10 | −0.01 | 0.10 |
| 0.0225 | −0.06 | 0.03 | 0.06 | −0.10 | 0.00 | 0.10 |
| 0.0275 | −0.05 | 0.03 | 0.06 | −0.10 | 0.00 | 0.10 |
| 0.0300 | −0.05 | 0.03 | 0.06 | −0.10 | 0.00 | 0.10 |
| 0.0325 | −0.05 | 0.03 | 0.05 | −0.10 | 0.01 | 0.10 |
| 0.0350 | −0.04 | 0.03 | 0.05 | −0.10 | 0.02 | 0.10 |
| 0.0375 | −0.04 | 0.03 | 0.05 | −0.09 | 0.02 | 0.10 |
| 0.0400 | −0.04 | 0.03 | 0.05 | −0.09 | 0.03 | 0.09 |
| 0.0425 | −0.04 | 0.04 | 0.05 | −0.08 | 0.04 | 0.09 |
| 0.0450 | −0.04 | 0.04 | 0.06 | −0.08 | 0.05 | 0.09 |
| 0.0475 | −0.04 | 0.04 | 0.06 | −0.07 | 0.06 | 0.09 |
| 0.0500 | −0.04 | 0.05 | 0.06 | −0.06 | 0.07 | 0.09 |
| 0.0525 | −0.04 | 0.05 | 0.07 | −0.05 | 0.08 | 0.10 |
| 0.0550 | −0.04 | 0.06 | 0.07 | −0.05 | 0.09 | 0.10 |
| 0.0575 | −0.04 | 0.06 | 0.07 | −0.04 | 0.11 | 0.12 |
| 0.0600 | −0.04 | 0.06 | 0.07 | −0.03 | 0.13 | 0.13 |
| 0.0625 | −0.04 | 0.06 | 0.07 | −0.03 | 0.14 | 0.15 |
| 0.0650 | −0.04 | 0.06 | 0.07 | −0.02 | 0.16 | 0.16 |
| 0.0675 | −0.03 | 0.06 | 0.07 | −0.01 | 0.19 | 0.19 |
| 0.0700 | −0.03 | 0.06 | 0.07 | 0.00 | 0.21 | 0.21 |
| 0.0725 | −0.03 | 0.06 | 0.06 | 0.01 | 0.25 | 0.25 |
| 0.0750 | −0.02 | 0.05 | 0.06 | 0.03 | 0.28 | 0.28 |
| 0.0775 | −0.01 | 0.05 | 0.05 | 0.05 | 0.32 | 0.32 |
| 0.0800 | 0.00 | 0.06 | 0.06 | 0.07 | 0.36 | 0.37 |
| 0.0825 | 0.01 | 0.06 | 0.06 | 0.09 | 0.41 | 0.42 |
| 0.0850 | 0.02 | 0.07 | 0.07 | 0.11 | 0.47 | 0.48 |
| 0.0875 | 0.03 | 0.09 | 0.09 | 0.13 | 0.52 | 0.54 |
| 0.0900 | 0.05 | 0.11 | 0.12 | 0.16 | 0.59 | 0.61 |
| 0.0925 | 0.06 | 0.13 | 0.15 | 0.18 | 0.65 | 0.68 |
| 0.0950 | 0.08 | 0.16 | 0.18 | 0.20 | 0.72 | 0.75 |
| 0.0975 | 0.10 | 0.20 | 0.22 | 0.23 | 0.79 | 0.83 |
| 0.1000 | 0.11 | 0.24 | 0.27 | 0.25 | 0.87 | 0.90 |
| 0.1025 | 0.13 | 0.29 | 0.32 | 0.28 | 0.94 | 0.98 |
| 0.1050 | 0.15 | 0.34 | 0.37 | 0.30 | 1.01 | 1.06 |
| 0.1075 | 0.18 | 0.40 | 0.44 | 0.33 | 1.08 | 1.13 |
| 0.1100 | 0.20 | 0.46 | 0.50 | 0.35 | 1.14 | 1.20 |
| 0.1125 | 0.23 | 0.53 | 0.57 | 0.37 | 1.20 | 1.26 |
| 0.1150 | 0.25 | 0.60 | 0.65 | 0.39 | 1.25 | 1.31 |
| 0.1175 | 0.29 | 0.67 | 0.73 | 0.41 | 1.29 | 1.35 |
| 0.1200 | 0.32 | 0.75 | 0.82 | 0.42 | 1.31 | 1.38 |
| 0.1225 | 0.35 | 0.84 | 0.91 | 0.43 | 1.33 | 1.40 |
| 0.1250 | 0.39 | 0.93 | 1.01 | 0.43 | 1.34 | 1.41 |
| 0.1275 | 0.43 | 1.02 | 1.10 | | | |
| 0.1300 | 0.46 | 1.11 | 1.20 | | | |
| 0.1325 | 0.50 | 1.20 | 1.30 | | | |
| 0.1350 | 0.53 | 1.29 | 1.40 | | | |
| 0.1375 | 0.56 | 1.38 | 1.49 | | | |
| 0.1400 | 0.59 | 1.46 | 1.58 | | | |
| 0.1425 | 0.61 | 1.54 | 1.65 | | | |
| 0.1450 | 0.62 | 1.60 | 1.72 | | | |
| 0.1475 | 0.63 | 1.65 | 1.77 | | | |
| 0.1500 | 0.64 | 1.68 | 1.80 | | | |
| 0.1525 | 0.65 | 1.70 | 1.82 | | | |

TABLE VI

Velocity Data: Horse B
Units: meters/sec.

| | Vault #3 | | | Vault #4 | | |
|---|---|---|---|---|---|---|
| time | x comp. | y comp. | result. | x comp. | y comp. | result. |
| −0.0850 | 4.02 | −2.14 | 4.56 | 3.71 | −2.25 | 4.34 |
| −0.0825 | 4.00 | −2.15 | 4.54 | 3.66 | −2.26 | 4.30 |
| −0.0800 | 3.98 | −2.15 | 4.52 | 3.59 | −2.26 | 4.24 |
| −0.0775 | 3.93 | −2.16 | 4.49 | 3.52 | −2.26 | 4.18 |
| −0.0750 | 3.87 | −2.17 | 4.44 | 3.44 | −2.25 | 4.11 |
| −0.0725 | 3.80 | −2.18 | 4.38 | 3.36 | −2.24 | 4.04 |
| −0.0700 | 3.70 | −2.19 | 4.30 | 3.27 | −2.22 | 3.95 |
| −0.0675 | 3.60 | −2.19 | 4.21 | 3.18 | −2.19 | 3.86 |
| −0.0650 | 3.48 | −2.20 | 4.11 | 3.08 | −2.15 | 3.76 |
| −0.0625 | 3.35 | −2.19 | 4.00 | 2.97 | −2.11 | 3.64 |
| −0.0600 | 3.20 | −2.18 | 3.87 | 2.86 | −2.05 | 3.52 |
| −0.0575 | 3.04 | −2.16 | 3.73 | 2.75 | −1.98 | 3.39 |
| −0.0550 | 2.88 | −2.12 | 3.57 | 2.63 | −1.90 | 3.25 |
| −0.0525 | 2.71 | −2.07 | 3.41 | 2.51 | −1.81 | 3.09 |
| −0.0500 | 2.53 | −2.00 | 3.22 | 2.38 | −1.71 | 2.93 |
| −0.0475 | 2.34 | −1.92 | 3.03 | 2.25 | −1.60 | 2.76 |
| −0.0450 | 2.16 | −1.83 | 2.83 | 2.11 | −1.48 | 2.58 |
| −0.0425 | 1.97 | −1.72 | 2.62 | 1.97 | −1.35 | 2.39 |
| −0.0400 | 1.79 | −1.60 | 2.40 | 1.83 | −1.22 | 2.20 |
| −0.0375 | 1.61 | −1.47 | 2.18 | 1.68 | −1.10 | 2.01 |

TABLE VI-continued

Velocity Data: Horse B
Units: meters/sec.

| | Vault #3 | | | Vault #4 | | |
|---|---|---|---|---|---|---|
| time | x comp. | y comp. | result. | x comp. | y comp. | result. |
| −0.0350 | 1.43 | −1.34 | 1.96 | 1.54 | −0.97 | 1.82 |
| −0.0325 | 1.26 | −1.20 | 1.74 | 1.39 | −0.85 | 1.63 |
| −0.0300 | 1.10 | −1.07 | 1.53 | 1.24 | −0.74 | 1.44 |
| −0.0275 | 0.95 | −0.94 | 1.33 | 1.10 | −0.63 | 1.27 |
| −0.0250 | 0.81 | −0.81 | 1.14 | 0.95 | −0.54 | 1.09 |
| −0.0225 | 0.68 | −0.68 | 0.96 | 0.82 | −0.45 | 0.93 |
| −0.0200 | 0.56 | −0.57 | 0.80 | 0.69 | −0.36 | 0.78 |
| −0.0175 | 0.45 | −0.47 | 0.65 | 0.57 | −0.29 | 0.64 |
| −0.0150 | 0.35 | −0.38 | 0.52 | 0.45 | −0.23 | 0.51 |
| −0.0125 | 0.27 | −0.30 | 0.40 | 0.35 | −0.17 | 0.39 |
| −0.0100 | 0.19 | −0.23 | 0.30 | 0.26 | −0.13 | 0.29 |
| −0.0075 | 0.13 | −0.17 | 0.21 | 0.19 | −0.09 | 0.21 |
| −0.0050 | 0.07 | −0.13 | 0.14 | 0.12 | −0.06 | 0.13 |
| −0.0025 | 0.02 | −0.09 | 0.09 | 0.06 | −0.04 | 0.07 |
| 0.0000 | −0.02 | −0.06 | 0.06 | 0.01 | −0.02 | 0.02 |
| 0.0025 | −0.05 | −0.03 | 0.06 | −0.03 | 0.00 | 0.03 |
| 0.0050 | −0.08 | −0.01 | 0.08 | −0.06 | 0.01 | 0.06 |
| 0.0075 | −0.10 | 0.01 | 0.10 | −0.09 | 0.01 | 0.09 |
| 0.0100 | −0.12 | 0.02 | 0.12 | −0.11 | 0.02 | 0.11 |
| 0.0125 | −0.14 | 0.03 | 0.14 | −0.12 | 0.02 | 0.12 |
| 0.0150 | −0.15 | 0.04 | 0.15 | −0.13 | 0.02 | 0.13 |
| 0.0175 | −0.16 | 0.05 | 0.16 | −0.14 | 0.01 | 0.14 |
| 0.0200 | −0.16 | 0.05 | 0.17 | −0.15 | 0.01 | 0.15 |
| 0.0225 | −0.16 | 0.06 | 0.17 | −0.15 | 0.01 | 0.15 |
| 0.0275 | −0.16 | 0.07 | 0.18 | −0.15 | 0.00 | 0.15 |
| 0.0300 | −0.16 | 0.07 | 0.17 | −0.15 | 0.00 | 0.15 |
| 0.0325 | −0.15 | 0.08 | 0.17 | −0.15 | 0.00 | 0.15 |
| 0.0350 | −0.14 | 0.09 | 0.16 | −0.14 | 0.00 | 0.15 |
| 0.0375 | −0.12 | 0.10 | 0.16 | −0.14 | 0.01 | 0.14 |
| 0.0400 | −0.11 | 0.11 | 0.16 | −0.14 | 0.01 | 0.14 |
| 0.0425 | −0.10 | 0.12 | 0.15 | −0.13 | 0.02 | 0.13 |
| 0.0450 | −0.09 | 0.13 | 0.15 | −0.12 | 0.03 | 0.13 |
| 0.0475 | −0.07 | 0.14 | 0.16 | −0.12 | 0.04 | 0.12 |
| 0.0500 | −0.06 | 0.15 | 0.16 | −0.11 | 0.05 | 0.12 |
| 0.0525 | −0.05 | 0.16 | 0.17 | −0.10 | 0.06 | 0.12 |
| 0.0550 | −0.03 | 0.17 | 0.18 | −0.09 | 0.07 | 0.12 |
| 0.0575 | −0.02 | 0.19 | 0.19 | −0.09 | 0.07 | 0.11 |
| 0.0600 | −0.01 | 0.20 | 0.20 | −0.08 | 0.08 | 0.12 |
| 0.0625 | 0.01 | 0.22 | 0.22 | −0.08 | 0.09 | 0.12 |
| 0.0650 | 0.03 | 0.24 | 0.24 | −0.07 | 0.10 | 0.12 |
| 0.0675 | 0.04 | 0.26 | 0.26 | −0.06 | 0.10 | 0.12 |
| 0.0700 | 0.06 | 0.28 | 0.29 | −0.06 | 0.11 | 0.12 |
| 0.0725 | 0.08 | 0.31 | 0.32 | −0.05 | 0.12 | 0.13 |
| 0.0750 | 0.10 | 0.35 | 0.36 | −0.05 | 0.13 | 0.14 |
| 0.0775 | 0.12 | 0.39 | 0.40 | −0.04 | 0.14 | 0.14 |
| 0.0800 | 0.13 | 0.43 | 0.45 | −0.04 | 0.15 | 0.16 |
| 0.0825 | 0.15 | 0.48 | 0.50 | −0.03 | 0.17 | 0.17 |
| 0.0850 | 0.16 | 0.53 | 0.55 | −0.02 | 0.18 | 0.18 |
| 0.0875 | 0.17 | 0.58 | 0.61 | −0.01 | 0.20 | 0.20 |
| 0.0900 | 0.18 | 0.64 | 0.67 | 0.00 | 0.22 | 0.22 |
| 0.0925 | 0.19 | 0.70 | 0.73 | 0.01 | 0.25 | 0.25 |
| 0.0950 | 0.19 | 0.77 | 0.79 | 0.02 | 0.28 | 0.28 |
| 0.0975 | 0.19 | 0.83 | 0.86 | 0.03 | 0.31 | 0.31 |
| 0.1000 | 0.20 | 0.90 | 0.92 | 0.05 | 0.35 | 0.35 |
| 0.1025 | 0.20 | 0.97 | 0.99 | 0.06 | 0.39 | 0.40 |
| 0.1050 | 0.20 | 1.03 | 1.05 | 0.07 | 0.44 | 0.45 |
| 0.1075 | 0.21 | 1.10 | 1.11 | 0.09 | 0.49 | 0.50 |
| 0.1100 | 0.21 | 1.15 | 1.17 | 0.11 | 0.55 | 0.56 |
| 0.1125 | 0.21 | 1.21 | 1.23 | 0.13 | 0.61 | 0.62 |
| 0.1150 | 0.22 | 1.26 | 1.28 | 0.14 | 0.67 | 0.69 |
| 0.1175 | 0.22 | 1.30 | 1.32 | 0.16 | 0.74 | 0.75 |
| 0.1200 | 0.23 | 1.34 | 1.36 | 0.18 | 0.80 | 0.82 |
| 0.1225 | 0.24 | 1.37 | 1.39 | 0.20 | 0.86 | 0.88 |
| 0.1250 | 0.24 | 1.39 | 1.41 | 0.21 | 0.91 | 0.94 |
| 0.1275 | 0.24 | 1.40 | 1.42 | 0.23 | 0.96 | 0.99 |
| 0.1300 | 0.24 | 1.41 | 1.43 | 0.24 | 1.01 | 1.03 |
| 0.1325 | | | | 0.24 | 1.04 | 1.07 |
| 0.1350 | | | | 0.25 | 1.07 | 1.10 |
| 0.1375 | | | | 0.25 | 1.09 | 1.12 |
| 0.1400 | | | | 0.25 | 1.11 | 1.13 |
| 0.1425 | | | | 0.25 | 1.11 | 1.14 |
| 0.1450 | | | | | | |
| 0.1475 | | | | | | |
| 0.1500 | | | | | | |
| 0.1525 | | | | | | |

Figure 4:
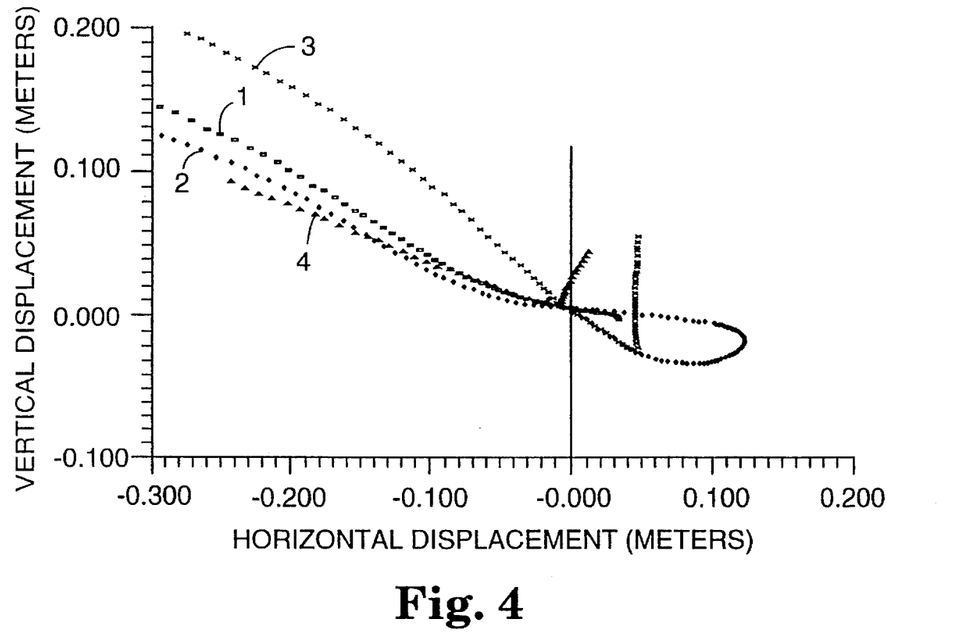
FIG. 4 is a graphical illustration of the paths of motion of the hands of illustrative gymnasts performing handspring full vaults using a horse with a conventional cover.
Figure 5:
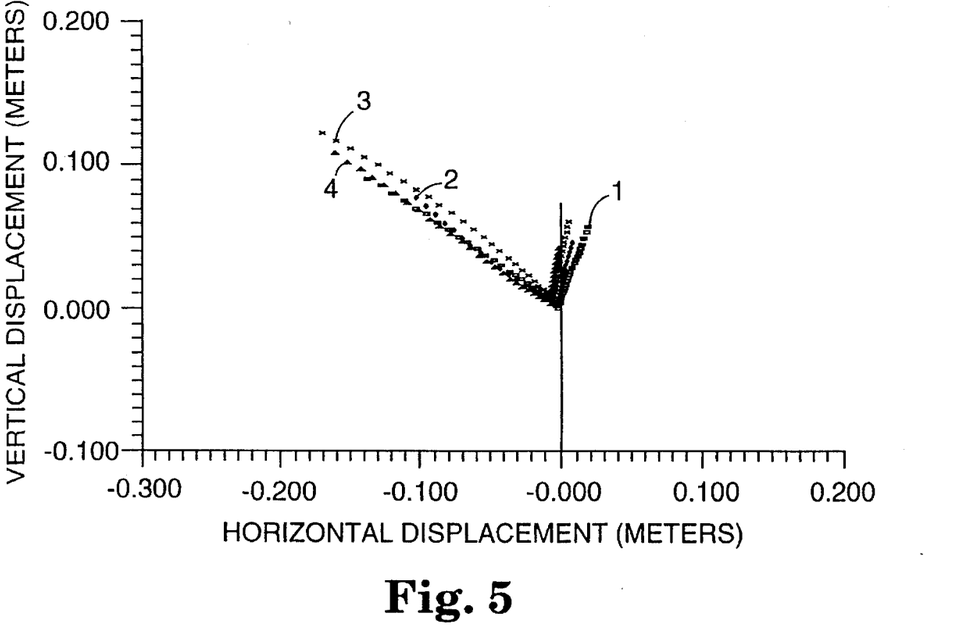
FIG. 5 is a graphical illustration of the paths of motion of the hands of illustrative gymnasts performing handspring full vaults using a horse covered with an illustrative slip control sheeting of the invention.

FIG. 4 shows the path of the target over time for each of the vaults by both gymnasts on Horse A. FIG. 5 shows the path of the target over time for each vault by both gymnasts on Horse B. In FIGS. 4–7, curves 1 and 3 represent the vaults by the first gymnast and curves 2 and 4 represent the vaults by the second gymnast.

As shown by reference to FIG. 4, substantial slipping was encountered during each of the vaults performed on Horse A, i.e., with a conventional cover. In distinction, as is readily determined from FIG. 5, very little slipping was encountered during the vaults on Horse B. Using the slip control sheeting of the invention, the gymnasts were able to perform four, very uniform vaults.

Figure 6:
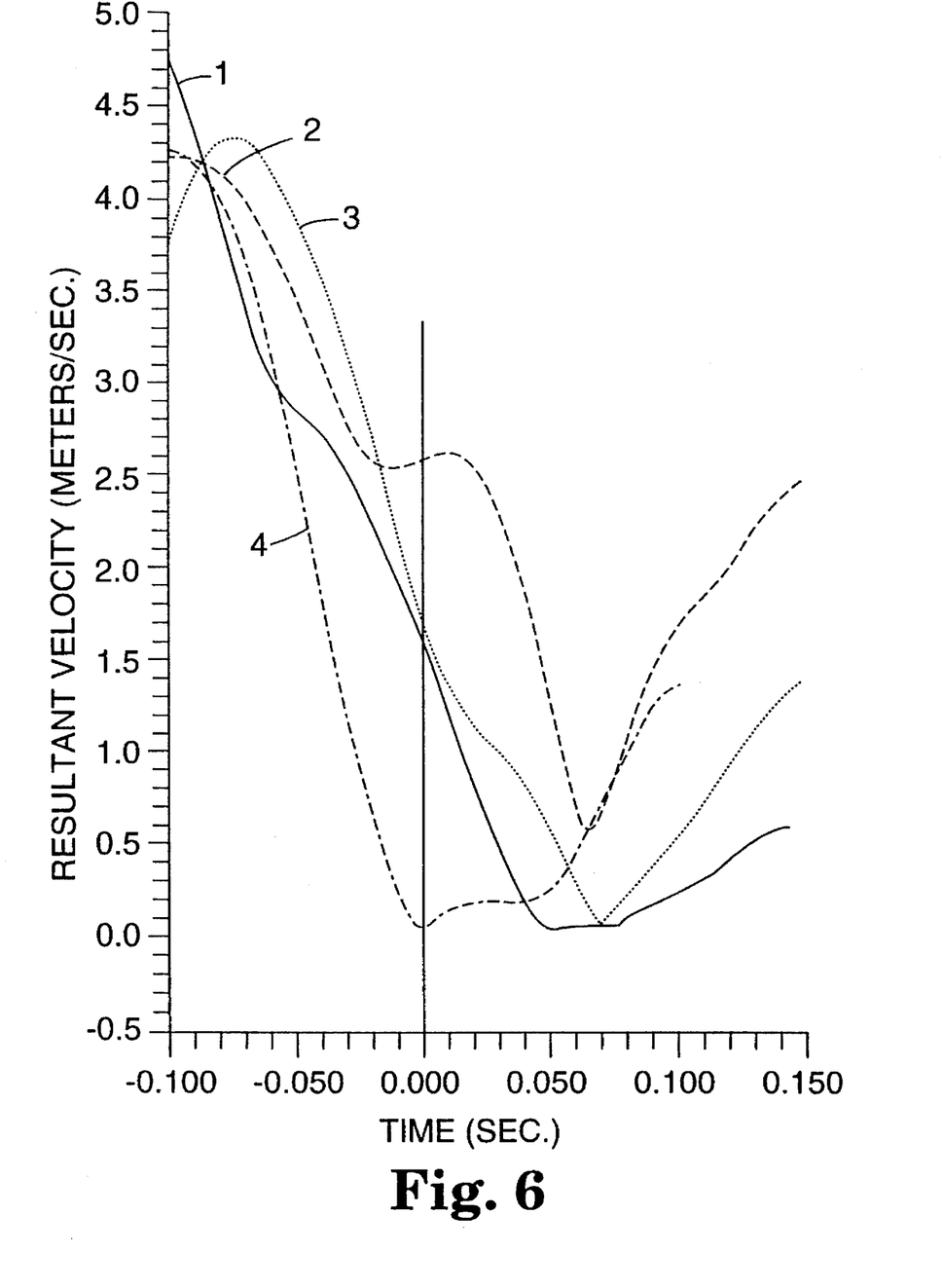
FIG. 6 is a graphical illustration of the resultant speed of the gymnasts in the vaults shown in FIG. 4.
Figure 7:
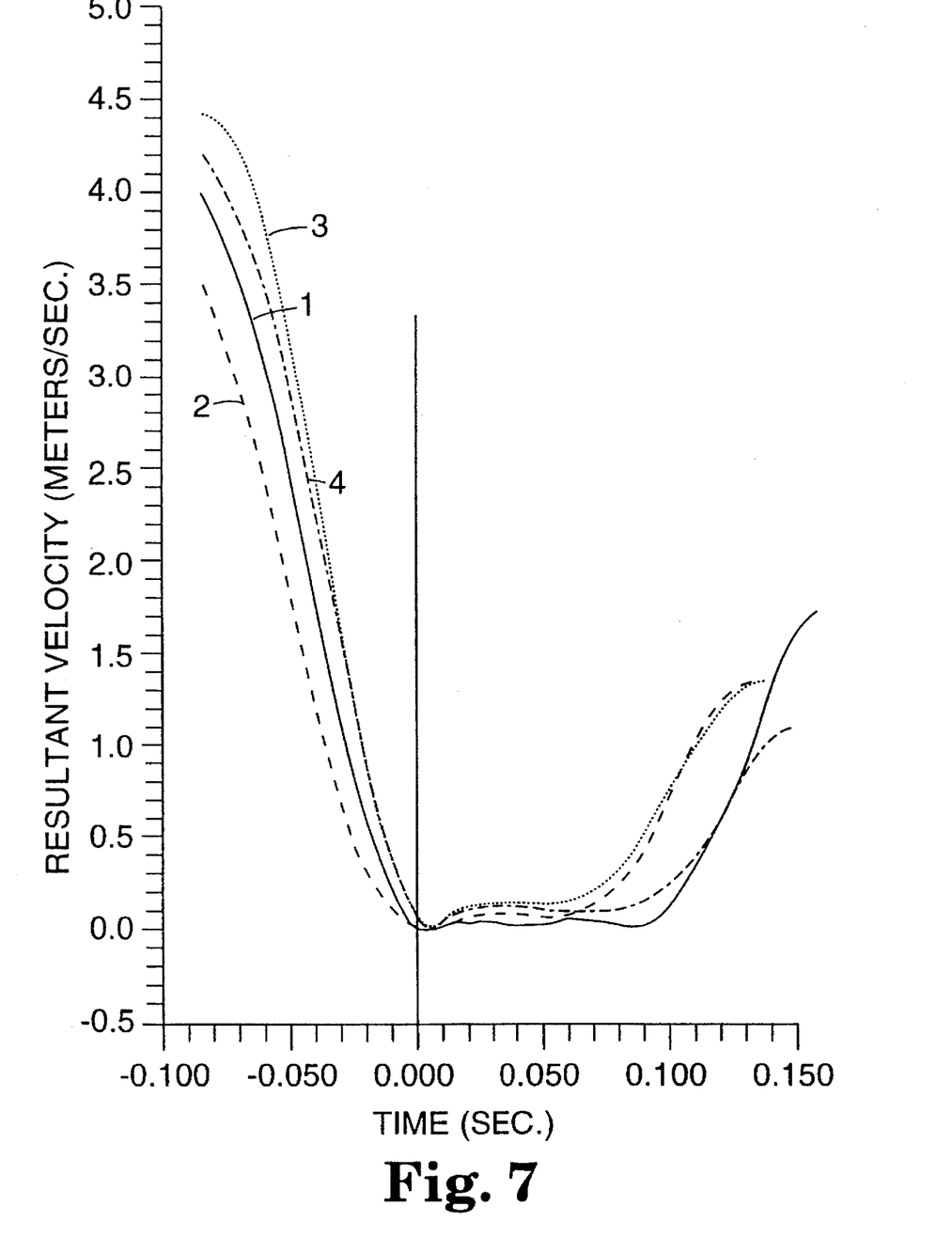
FIG. 7 is a graphical illustration of the resultant speed of the gymnasts in the vaults shown in FIG. 5.

FIG. 6 is a graphical illustration of the resultant velocities of the gymnasts in the vaults shown in FIG. 4 and FIG. 7 is a corresponding graphical illustration of the resultant velocities of the gymnasts in the vaults shown in FIG. 5. "Resultant velocity" is the magnitude of the vector sum of the vertical and horizontal velocities as calculated from the tables.

Various modifications and alterations of this invention will become apparent to those skilled in the art without departing from the scope and spirit of this invention.

What is claimed is:

1. A slip control sheeting comprising a backing having a first and a second major surface and an array of protrusions on said first major surface, said protrusions being at least one of pyramids with polygonal bases or pyramidal frustums with polygonal bases, the height of said protrusions being between about 75 and about 750 microns, said sheeting further comprising at least one of (1) a layer of adhesive on said second major surface, (2) a reinforcing web, or (3) a mechanical fastening component for fastening said backing to a substrate.

2. The sheeting of claim 1 wherein said sheeting includes said adhesive layer, and said adhesive layer is selected from the group consisting of heat-activated adhesives, pressure-sensitive adhesives, and mixtures thereof.

3. The sheeting of claim 1 wherein said sheeting includes said reinforcing web, and said reinforcing web is at least partially embedded in said backing.

4. The sheeting of claim 1 wherein said sheeting includes said reinforcing web, and said reinforcing web is secured to said second major surface of said backing.

5. The sheeting of claim 1 wherein said sheeting includes said mechanical fastening component, and said mechanical fastening component comprises a plurality of hooks on said second major surface constituting part of a hook and loop fastening system.

6. The sheeting of claim 1 wherein said sheeting includes said mechanical fastening component, and said mechanical fastening component comprises a plurality of loops on said second major surface constituting part of a hook and loop fastening system.

7. The sheeting of claim 1 wherein said sheeting includes said mechanical fastening component, and said mechanical fastening component comprises a structured surface which includes a plurality of tapered elements, each tapered element comprising a side which is inclined relative to the plane of the structured surface at an angle sufficient to form a taper such that each tapered element is adapted to mate with at least one corresponding element of a complementarily structured surface of a substrate.

8. A slip control sheeting comprising a backing having a first and a second major surface and an array of protrusions on said first major surface, said protrusions being at least one of pyramids with polygonal bases or pyramidal frustums with polygonal bases, the height of said protrusions being between about 75 and about 750 microns, wherein said sheeting retroreflects less than about 10 percent of a beam of electromagnetic radiation which is incident at any angle to said second major surface, the electromagnetic radiation having any wavelength from about 0.39 microns to about 1,000 microns.

9. The sheeting of claims 1 or 8 wherein said polygonal bases of said protrusions are selected from the group consisting of triangular bases, quadrilateral bases, pentagonal bases, hexagonal bases, heptagonal bases, octagonal bases, nonagonal bases and decagonal bases.

10. The sheeting of claims 1 or 8 wherein said protrusions are pyramids with triangular bases.

11. The sheeting of claims 1 or 8 wherein said polygonal bases of said protrusions are immediately adjacent one another.

12. The sheeting of claims 1 or 8 wherein the lengths of the line segments which define said polygonal bases are between about 125 and about 750 microns.

13. The sheeting of claims 1 or 8 wherein the lengths of the line segments which define said polygonal bases are between about 250 and about 500 microns.

14. The sheeting of claims 1 or 8 wherein said protrusions have aspect ratios which are from about 0.3 to about 0.6.

15. The sheeting of claims 1 or 8 wherein said protrusions have a height of between about 125 and about 225 microns.

16. The sheeting of claims 1 or 8 wherein said protrusions have a height of about 175 microns.

17. The sheeting of claims 1 or 8 wherein said backing comprises a polymeric film selected from the group consisting of polyvinyls, polyurethanes, polyesters, polyacrylics, polycarbonates, polyolefins, and mixtures thereof.

18. The sheeting of claims 1 or 8 wherein said backing comprises a film comprising polyurethane.

19. The sheeting of claims 1 or 8 wherein said backing is between about 100 and about 500 microns thick.

20. The sheeting of claims 1 or 8 wherein said sheeting is sufficiently flexible to be wound about itself on a 2.54 centimeter diameter mandrel.

21. The sheeting of claim 8, further comprising at least one of (1) a layer of adhesive on said second major surface, (2) a reinforcing web, or (3) a mechanical fastening component for fastening said backing to a substrate.

22. A sheeting of claims 1 or 8 applied to the handle of a tool, mallet, racquet, baseball bat, golf club, or sport stick, or to an eye glass support surface, or a diving board surface, or to the gripping surface of a glove.

23. A gymnastic apparatus having a sheeting of claims 1 or 8 on at least a portion of the surface thereof.

24. The gymnastic apparatus of claim 23 wherein said gymnastic apparatus is selected from the group consisting of vaulting horse, pommel horse, parallel bars, uneven bars, high bar, balance beam, vault spring board, vault runway, still rings and landing mats.

25. A gymnastic apparatus having a sheeting of claim 10 on at least a portion of the surface thereof.

26. The gymnastic apparatus of claim 25 wherein said structure is one of the following: vaulting horse, pommel horse, parallel bars, uneven bars, high bar, balance beam, vault spring board, vault runway, still rings and landing mats.

27. An article adapted for interaction with hands or feet, having a slip control sheeting on at least a portion of the surface thereof, said sheeting comprising a backing having a first and a second major surface and an array of protrusions on said first major surface, said protrusions being at least one of pyramids with polygonal bases or pyramidal frustums with polygonal bases, the height of said protrusions being between about 75 and about 750 microns.

28. The article of claim 27 wherein said protrusions of said sheeting have aspect ratios from about 0.3 to about 0.6.

* * * * *

UNITED STATES PATENT AND TRADEMARK OFFICE
CERTIFICATE OF CORRECTION

PATENT NO.: 5,491,015

DATED: Feb. 13, 1996

INVENTOR(S): Reeves et al.

It is certified that error appears in the above-identified patent and that said Letters Patent is hereby corrected as shown below:

Col. 9, Table 1, With the line starting "-0.0300" delete "-0.653" and insert -- -0.053--

Col. 13, Table 2, With the line starting "0.0775" insert a dash before "0.002"

Signed and Sealed this

Eighteenth Day of June, 1996

Attest:

BRUCE LEHMAN

Attesting Officer

Commissioner of Patents and Trademarks